US012321997B2

(12) United States Patent
Badino et al.

(10) Patent No.: US 12,321,997 B2
(45) Date of Patent: Jun. 3, 2025

(54) METHOD AND SYSTEM FOR DATA AUGMENTATION IN AN AUTOMATED REAL PROPERTY MERCHANDISING SYSTEM

(71) Applicant: Zenlist, Inc., Lafayette, CA (US)

(72) Inventors: Andrea Badino, San Francisco, CA (US); Tom MacLeod, Lafayette, CA (US); Bob Safranski, Chicago, IL (US); Jacob Thompson, Westborough, MA (US)

(73) Assignee: Zenlist, Inc., Lafayette, CA (US)

( * ) Notice: Subject to any disclaimer, the term of this patent is extended or adjusted under 35 U.S.C. 154(b) by 0 days.

(21) Appl. No.: 18/671,415

(22) Filed: May 22, 2024

(65) Prior Publication Data
US 2024/0311938 A1    Sep. 19, 2024

Related U.S. Application Data

(63) Continuation of application No. 16/989,126, filed on Aug. 10, 2020, now Pat. No. 12,014,434.
(Continued)

(51) Int. Cl.
*G06Q 50/16* (2024.01)
*G06F 3/0482* (2013.01)
(Continued)

(52) U.S. Cl.
CPC ........... *G06Q 50/16* (2013.01); *G06F 3/0482* (2013.01); *G06F 16/258* (2019.01); *G06F 16/29* (2019.01);
(Continued)

(58) Field of Classification Search
CPC .... G06Q 50/167; G06Q 10/10; G06Q 10/107; G06Q 30/018; G06Q 30/0201;
(Continued)

(56) References Cited

U.S. PATENT DOCUMENTS 7,415,356 B1    8/2008  Gowda et al.
7,640,204 B2   12/2009  Florance et al.
(Continued)

FOREIGN PATENT DOCUMENTS

CA        2639154 A1    2/2009
CA        2381122 C     3/2012
WO     WO2020117750    6/2020

OTHER PUBLICATIONS

Williamson, et al., The Dynamic Home Finder: Evaluating Dynamic Queries in a Real-Estate Information Exploration System, Proceedings of the 15th annual international ACM SIGIR conference on Research and development in information retrieval, pp. 338-346 (1992) (Year: 1992).*

(Continued)

*Primary Examiner* — Charles Guiliano
(74) *Attorney, Agent, or Firm* — Richard K. Huffman; Huffman Patent Group, LLC

(57) ABSTRACT

A system for presenting properties includes: a server, coupled to client devices via the internet, the server including: a unification module, that periodically accesses data sources for listings, where the data sources include on-market sources and off-market sources, and that retrieves the listings from the sources, converts the listings to a common format, and stores the listings in the common format, and that detects deficiencies in the listings that cannot be resolved by accessing public data sources; and an intelligence module, that receives a request from the unification module for data that can resolve the deficiencies, and that accesses an external entities database to select external entities that can provide the data, and that automatically generates requests to the external entities to provide the data, and that automatically receives the data to enable the uni- (Continued)

fication module to update a parcel record in a parcel database associated with the deficiencies.

20 Claims, 16 Drawing Sheets

Related U.S. Application Data

(60) Provisional application No. 62/884,803, filed on Aug. 9, 2019.

(51) Int. Cl.

| | |
|---|---|
| G06F 16/25 | (2019.01) |
| G06F 16/29 | (2019.01) |
| G06F 16/9535 | (2019.01) |
| G06F 16/9537 | (2019.01) |
| G06F 16/9538 | (2019.01) |
| G06Q 30/0201 | (2023.01) |
| G06F 16/9536 | (2019.01) |
| G06Q 10/10 | (2023.01) |
| G06Q 30/018 | (2023.01) |
| G06Q 30/0601 | (2023.01) |
| G06Q 50/26 | (2024.01) |
| H04L 51/046 | (2022.01) |
| H04L 67/10 | (2022.01) |

(52) U.S. Cl.
CPC ...... *G06F 16/9535* (2019.01); *G06F 16/9537* (2019.01); *G06F 16/9538* (2019.01); *G06Q 30/0201* (2013.01); *G06F 16/9536* (2019.01); *G06Q 10/10* (2013.01); *G06Q 30/018* (2013.01); *G06Q 30/0617* (2013.01); *G06Q 30/0627* (2013.01); *G06Q 50/26* (2013.01); *H04L 51/046* (2013.01); *H04L 67/10* (2013.01)

(58) Field of Classification Search
CPC .......... G06Q 30/0617; G06Q 30/0627; G06Q 50/16; G06Q 50/26; G06F 16/254; G06F 16/258; G06F 16/29; G06F 16/9535; G06F 16/9536; G06F 16/9537; G06F 16/9538; G06F 40/174; G06F 40/20; G06F 40/35; G06F 3/0482; G06N 5/02; G06N 5/046; H04L 51/046; H04L 67/10; H04L 51/56; H04L 67/53; H04L 67/565
See application file for complete search history.

(56) References Cited

U.S. PATENT DOCUMENTS

| | | | |
|---|---|---|---|
| 9,213,461 | B2 | 12/2015 | Eraker et al. |
| 9,411,901 | B2 | 8/2016 | Bacus et al. |
| 9,706,011 | B2 | 7/2017 | Smedberg et al. |
| 10,074,111 | B2 | 9/2018 | Humphries et al. |
| 10,188,049 | B1 | 1/2019 | Emanuel |
| 10,305,765 | B2 | 5/2019 | Church et al. |
| 10,521,191 | B1 | 12/2019 | Puttick |
| 11,069,010 | B1 | 7/2021 | Shenoy et al. |
| 11,430,077 | B2 | 8/2022 | Gibbon et al. |
| 11,483,266 | B2 | 10/2022 | Everton et al. |
| 11,580,564 | B2 | 2/2023 | Sasson |
| 11,610,241 | B2 | 3/2023 | Dupray |
| 11,935,099 | B2 | 3/2024 | Faupel et al. |
| 2003/0055747 | A1 | 3/2003 | Carr et al. |
| 2003/0187756 | A1 | 10/2003 | Klivington et al. |
| 2008/0126170 | A1 | 5/2008 | Leck et al. |
| 2008/0140701 | A1 | 6/2008 | Kulbaba |
| 2008/0183598 | A1 | 7/2008 | Carr et al. |
| 2009/0063232 | A1 | 3/2009 | Lissack et al. |
| 2010/0094548 | A1 | 4/2010 | Tadman et al. |
| 2010/0094714 | A1 | 4/2010 | Varon |
| 2014/0009468 | A2* | 1/2014 | Mueller ................. G06T 15/04 345/426 |
| 2015/0100430 | A1 | 4/2015 | Owen et al. |
| 2015/0302488 | A1 | 10/2015 | Wilson et al. |
| 2015/0310446 | A1 | 10/2015 | Tuchman et al. |
| 2015/0379588 | A1 | 12/2015 | Ma et al. |
| 2016/0027051 | A1 | 1/2016 | Gross |
| 2016/0132945 | A1 | 5/2016 | Phillips et al. |
| 2016/0189271 | A1 | 6/2016 | Cutting |
| 2016/0314425 | A1 | 10/2016 | Cunningham et al. |
| 2016/0314545 | A1* | 10/2016 | Jessen ................ G06Q 30/0278 |
| 2017/0337569 | A1* | 11/2017 | Sasson ............... G06Q 30/0201 |
| 2018/0032536 | A1 | 2/2018 | Stachowski |
| 2018/0225784 | A1 | 8/2018 | Ashokan |
| 2018/0253780 | A1 | 9/2018 | Wang et al. |
| 2018/0322597 | A1 | 11/2018 | Sher |
| 2019/0102846 | A1 | 4/2019 | Loschiavo |
| 2021/0042861 | A1 | 2/2021 | Badino et al. |
| 2021/0042862 | A1 | 2/2021 | Badino et al. |
| 2021/0042863 | A1 | 2/2021 | Badino et al. |
| 2021/0042864 | A1 | 2/2021 | Badino et al. |
| 2023/0306540 | A1 | 9/2023 | Carcamo et al. |

OTHER PUBLICATIONS

Karani, Alex. "6 Reasons You Should Look for Off Market Real Estate Deals." mashvisor. Aug. 8, 2019. pp. 1-6. Downloaded from https://www.mashvisor.com/blog/off-market-real-estate-deals/.
Hamed, Eman. "What are Off Market Properties? How Can You Find One" mashvisor. Jun. 4, 2019. pp. 1-11. Downloaded from https://www.mashvisor.com/blog/what-are-off-market-properties/.
White, Marian. "What are the Pros & Cons of a Pocket Listing." moving.com. Nov. 21, 2018. pp. 1-6. Downloaded from https://www.moving.com/tips/what-are-the-pros-cons-of-a-pocket-listing/.
Brands, Ballen. "IDX Broker Tutorial I How to Find Your Listings in IDX Broker." Apr. 24, 2018. pp. 1-4. Downloaded from https://ballenbrands.com/idx-broker-listings/ with YouTube screen capture to support date of publication of video https://www.youtube.com/watch?v=bL8xAWqFgvU&t-12s.
Anonymous "Real Estate Transaction Standards (RETS)." Jan. 30, 2018. pp. 1-13. Downloaded from https://web.archive/org/web/20180130000957/https://www.nar.realtor/real-estate-transaction-standards-rets#section-166112.
"Server Definition" LINFO. May 16, 2005. pp. 1-2. Downloaded from http://www.linfo.org/server.html.
Anonymous. "Producers Forum™ Founder Says Off Market Listing Services Complement MLS, Afford Enhanced Fiduciary and Re-Empower the Sales Pro at Inman Real Estate Connect." Inter Wire. Jul. 12, 2013 pp. 1-2.
"World's Largest Real Estate Portal Network, ListGlobally, Expands into North America." Real Estate Monitor Worldwide. Aug. 17, 2018. pp. 1-2.
Williamson, Christopher et al. "The Dynamic HomeFinder: Evaluating Dynamic Queries in a Real-Estate Information Exploration System." Proceedings of the 15th Annual International ACM SIGIR Conference on Research and Development in Information Retrieval. pp. 338-346. Denmark Jun. 1992.
MagnetismXRM "CRM 2015 Custom Alerts and Popup Dialogs in JavaScript" Aug. 9, 2015. https://community.dynamics.com/blogs/post/?postid=e2cc2b62-e284-44e5-9fae-32e725105270. (Year: 2015) pp. 1-3.
User Experience "In which situations is a popup window most appropriate" Feb. 21, 2012. https://ux.stackexchange.com/questions/17548/in-which-situations-is-a-popup-window-most-appropriate#:~:text=Their%20primary%20use%20appears%20to,the%20user%20in%20th%20process. (Year: 2012) pp. 1-3.
User Experience "Should alert boxes be avoided at any cost" Oct. 14, 2009. https://ux.stackexchange.com/questions/4518/should-alert-boxes-be-avoided-at-any-cost (Year: 2009) pp. 1-7.

* cited by examiner

REAL PROPERTY AGGREGATION, UNIFICATION, AND COLLABORATION SYSTEM

COLLABORATION MODULE AND RELATIONSHIP MODULE INTERACTIONS

EXEMPLARY COLLABORATION ENHANCEMENT AUGMENTATION METHOD

EXEMPLARY RELATIONSHIP METHOD FOR PROPERTY INFORMATION RETRIEVAL

FIG. 15

*EXEMPLARY AGENT DISPLAY ON CLIENT DEVICE*

1500

BUYER INFO
1501

| AGENT LISTING A |
| AGENT LISTING B |
| AGENT LISTING C |
| AGENT LISTING D |
| AGENT LISTING E |
| AGENT LISTING F |
| AGENT LISTING G |
| AGENT LISTING H |

1502

| ANALYTIC 1 |
| ANALYTIC 2 |
| ANALYTIC 3 |
| ANALYTIC 4 |
| ANALYTIC 5 |
| ANALYTIC 6 |

1503

| LISTING D |
| LISTING F |
| LISTING G |
| LISTING I |
| LISTING J |
| LISTING K |
| LISTING M |
| LISTING N |

1504

AGENT/BUYER/COLLABORATOR COMMUNICATIONS
1505

| URGENT COMMUNICATION 1 |
| URGENT COMMUNICATION 2 |
| URGENT COMMUNICATION 3 |

1506

| NORMAL COMMUNICATION A |
| NORMAL COMMUNICATION B |
| NORMAL COMMUNICATION C |

1507

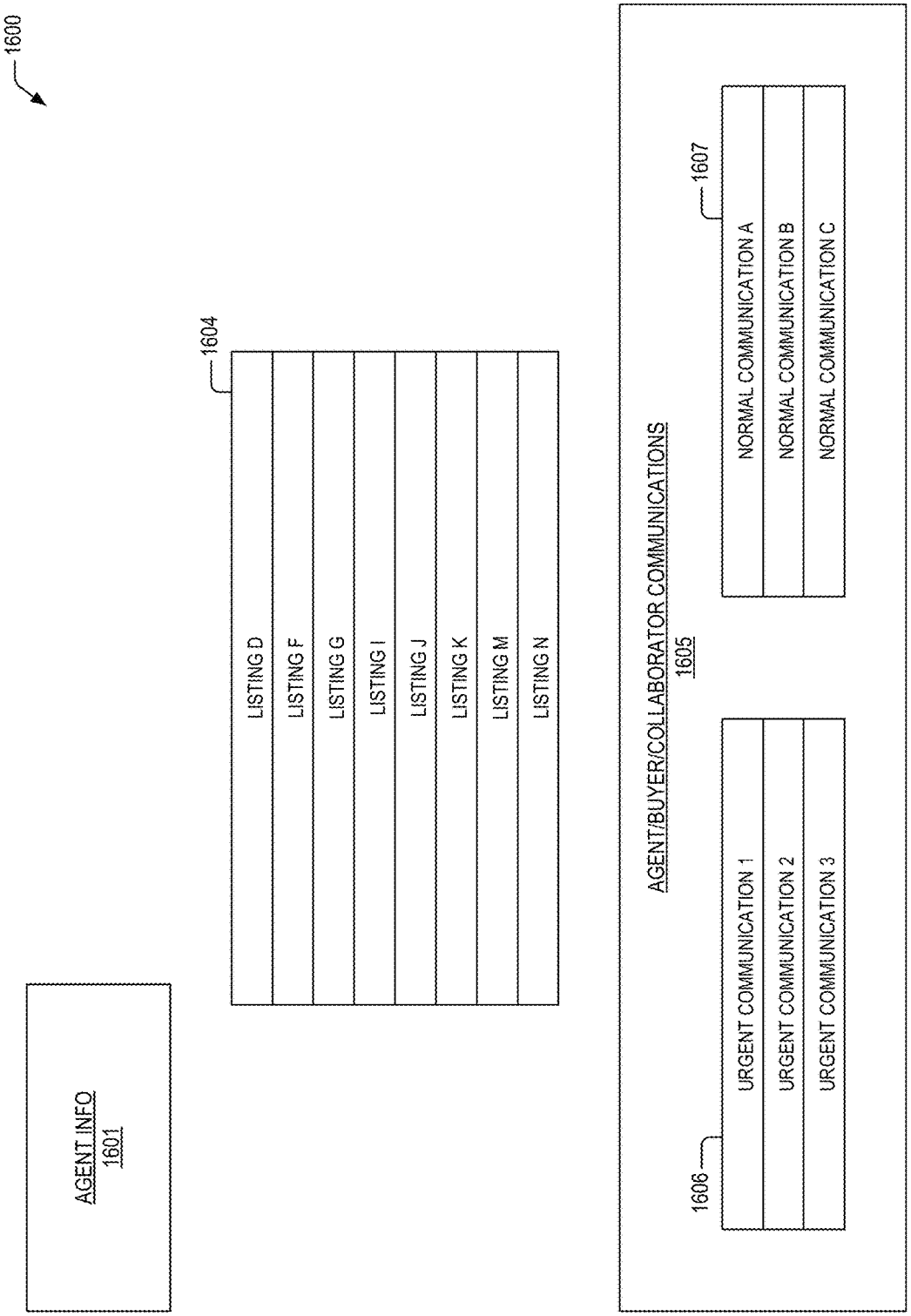

METHOD AND SYSTEM FOR DATA AUGMENTATION IN AN AUTOMATED REAL PROPERTY MERCHANDISING SYSTEM

CROSS-REFERENCE TO RELATED APPLICATIONS

This application is a continuation of the following U.S. Nonprovisional Application, which is herein incorporated by reference in its entirety.

| SERIAL NUMBER | FILING DATE | TITLE |
|---|---|---|
| 16/989,126 (ZL.0104) | Aug. 10, 2020 | METHOD AND APPARATUS FOR AUTOMATED REAL PROPERTY AGGREGATION, UNIFICATION, AND COLLABORATION |

U.S. Nonprovisional application Ser. No. 16/989,126 claims the benefit of the following U.S. Provisional Application, which is herein incorporated by reference in its entirety.

| SERIAL NUMBER | FILING DATE | TITLE |
|---|---|---|
| 62/884,803 (ZL.0101) | Aug. 9, 2019 | METHOD AND APPARATUS FOR AUTOMATED REAL PROPERTY AGGREGATION, UNIFICATION, AND COLLABORATION |

This application is related to the following co-pending U.S. Patent Applications, each of which has a common assignee and common inventors, the entireties of which are herein incorporated by reference.

| SERIAL NUMBER | FILING DATE | TITLE |
|---|---|---|
| 16/989,009 (ZL.0102) | Aug. 10, 2020 | METHOD AND APPARATUS FOR AUTOMATED REAL PROPERTY AGGREGATION, UNIFICATION, AND COLLABORATION |
| 16/989,098 (ZL.0103) | Aug. 10, 2020 | METHOD AND APPARATUS FOR AUTOMATED COLLABORATION IN A REAL PROPERTY MERCHANDISING SYSTEM |
| 16/989,147 (ZL.0105) | Aug. 10, 2020 | METHOD AND APPARATUS FOR DATA UNIFICATION IN AN AUTOMATED REAL PROPERTY MERCHANDISING SYSTEM |

BACKGROUND OF THE INVENTION

Field of the Invention

This invention relates in general to the field of automated, large-scale real estate parcel search and retrieval, and more particularly to a method and apparatus for real property aggregation, unification, and collaboration.

Description of the Related Art

Real estate agents are still the primary way that people find homes. Via this process, a buyer enters into contract with a listing agent, the buyer conveys to the agent hard requirements and desires for a property, the agent performs a manual search of a market listing database, and sends results of the search to the buyer, generally in a list form where the most likely candidate properties are at the top of the list. The buyer then reviews the list, selects one or more of the properties, and collaborates with the agent, often iteratively, to ask for more data above certain listings, to schedule showings, and eventually to reach a purchase decision. This collaboration primarily occurs in-person, via phone calls, texts, and emails.

An alternative way that buyers find properties is through searching one of the common web search portals such as Zillow or Trulia. In this scenario, a buyer enters search criteria for properties and then views results of the search that show properties available within the respective portal's database that meet the buyer's search criteria. Following this, the buyer may ask their listing agent to set up showings the seller's agent, or the buyer may contact the seller's agent directly. Like the first case, collaboration primarily occurs in-person, via phone calls, texts, and emails.

The present inventors have observed that the above two techniques for finding and purchasing properties are problematic for several reasons. First, listing agents generally only have access to listing services, such as the ubiquitous Multiple Listing Service (MLS), to which they subscribe. They may subscribe to other services or in-house services to obtain pre-market and off-market listings, but data for these listings are generally sparse and in a different format that MLS data. Consequently, agents must be skilled in operating two or more different search engines because there is not consistent service that provides all the listings in a market in a unified format.

In addition, when a buyer enters into contract with a listing agent, the agent typically enters the buyer's hard requirements (e.g., location, price point, number of bedrooms and baths) and desires (e.g., fireplace, pool, good schools, near good restaurants) into a tracking system, and this hard requirements and desires and employed to search the available listing services. If the buyer's requirements and desires diverge over time, it is up to the agent to revise this data in the tracking system, which often doesn't happen. Buyers are frequently handed lists of properties that meet their initial set of requirements and desires, but that don't satisfy their diverged requirements and desires.

Moreover, collaboration between buyers and agents is hodgepodge more often than not because there is no systematic technique for determining and obtaining additional data for a property or for determining the most effective communication medium for certain classes of messages. This form of ad hoc collaboration is rife with potential for errors and missed opportunities.

Accordingly, the present inventors have sensed a need in the art for techniques, mechanisms, systems, and methods that bring together buyers, agents, and other collaborators to improve the overall efficiency, accuracy, and experience of a search for one or more real properties. These techniques, mechanisms, systems, and methods must provide for: 1) unification/aggregation of all real property listing data into a centralized and normalized dataset; 2) improved collaboration between buyers, other collaborators (friends, family), and agents; 3) analytics and intelligence functions that supply buyers with answers to questions they didn't (yet) know to ask; and improved communication between all parties through optimized communication strategies.

SUMMARY OF THE INVENTION

The present invention, among other applications, is directed to solving the above-noted problems and addresses other problems, disadvantages, and limitations of the prior art. The present invention provides a superior technique for effectively storing real properties, searching the properties, and enhancing collaboration between buyers and agents.

A first aspect of the present invention contemplates an automated method for obtaining, storing, searching, and presenting requested information for real estate properties, the method including: periodically accessing a plurality of data sources for property listings, where the plurality of data sources includes on-market property sources and off-market property sources, the periodically accessing including: retrieving the property listings from the plurality of sources; converting the property listings to a common format; and storing the property listings in the common format in a parcel database; displaying, on a graphical user interface (GUI) of a client device, icons corresponding to initial property listings from the parcel database that meet initial requirements of a buyer arranged on the GUI in a first order; monitoring actions of a buyer when searching for and viewing initial property listings, calculating machine intelligence provided analytics of the actions, and generating revised property listings from the parcel database that meet revised requirements of the buyer based on the machine intelligence provided analytics; rearranging and displaying, on the GUI, the icons corresponding to the initial property listings rearranged on the GUI in a second order different from the first order base on the analytics of the actions; removing, from the GUI, one or more of the icons corresponding to the initial property listings and displaying, on the GUI, additional icons corresponding to the revised property listings; and examining communications between the buyer and the agent within an automated system, the examining including: noting a query from the buyer that is entered via a communications window on the client device and whether the query is a normal query or an urgent query, and parsing the query; in response to determining that information corresponding to the query is within the parcel database, retrieving the information; in response to determining that the information corresponding to the query is not within the parcel database, processing images or videos corresponding to the query to extract relevant data and generating the information from the extracted relevant data; inserting the information into a conversation on the client device and indicating whether the information is a response to the normal query or to the urgent query, where the information is inserted via a message bubble, a popup window, or voice; detecting a change in buyer criteria by detecting a custom request for additional information from the buyer within the communications based on information provided in the revised property listings, where the additional information is not available in the parcel database; updating the machine intelligence provided analytics based on the change in buyer criteria; and employing updated machine intelligence provided analytics to: match the custom request with a particular data source and obtain data from the data source corresponding to the initial information; generated the additional information based upon the data obtained from the particular data source; and insert the additional information into the communications that are transmitted from the agent back to the buyer.

Another aspect of the present invention envisages a non-transitory computer-readable storage medium storing instructions that, when executed by a computer, cause the computer to perform a method searching, generating, and presenting requested information for real estate properties, the method including: periodically accessing a plurality of data sources for property listings, where the plurality of data sources includes on-market property sources and off-market property sources, the periodically accessing including: retrieving the property listings from the plurality of sources; converting the property listings to a common format; and storing the property listings in the common format in a parcel database; displaying, on a graphical user interface (GUI) of a client device, icons corresponding to initial property listings from the parcel database that meet initial requirements of a buyer arranged on the GUI in a first order; monitoring actions of a buyer when searching for and viewing initial property listings, calculating machine intelligence provided analytics of the actions, and generating revised property listings from the parcel database that meet revised requirements of the buyer based on the machine intelligence provided analytics; rearranging and displaying, on the GUI, the icons corresponding to the initial property listings rearranged on the GUI in a second order different from the first order base on the analytics of the actions; removing, from the GUI, one or more of the icons corresponding to the initial property listings and displaying, on the GUI, additional icons corresponding to the revised property listings; and examining communications between the buyer and the agent within an automated system, the examining including: noting a query from the buyer that is entered via a communications window on the client device and whether the query is a normal query or an urgent query, and parsing the query; in response to determining that information corresponding to the query is within the parcel database, retrieving the information; in response to determining that the information corresponding to the query is not within the parcel database, processing images or videos corresponding to the query to extract relevant data and generating the information from the extracted relevant data; inserting the information into a conversation on the client device and indicating whether the information is a response to the normal query or to the urgent query, where the information is inserted via a message bubble, a popup window, or voice; detecting a change in buyer criteria by detecting a custom request for additional information from the buyer within the communications based on information provided in the revised property listings, where the additional information is not available in the parcel database; updating the machine intelligence provided analytics based on the change in buyer criteria; and employing updated machine intelligence provided analytics to: match the custom request with a particular data source and obtain data from the data source corresponding to the initial information; generated the additional information based upon the data obtained from the particular data source; and insert the additional information into the communications that are transmitted from the agent back to the buyer.

A further aspect of the present invention comprehends a system for obtaining, storing, searching, and presenting requested information for real estate properties, the system including: a collaborative real estate server, coupled to one or more client devices via the internet cloud, configured to executed one or more applications programs including modules, the modules including: a unification module, configured to: periodically access a plurality of data sources for property listings, where the plurality of data sources includes on-market property sources and off-market property sources; retrieve the property listings from the plurality of sources; convert the property listings to a common format; and store the property listings in the common format in a parcel database; a relationship module, configured to: direct a client device to display, on a graphical user interface (GUI) of the client device, icons corresponding to the initial property listings from the parcel database that meet initial requirements of a buyer arranged on the GUI in a first order; monitor actions of the buyer when searching for and viewing the initial property listings, calculate machine intelligence provided analytics of the actions, and generate revised property listings from the parcel database that meet revised requirements of the buyer based on the machine intelligence provided analytics; direct the client device to rearrange and display, on the GUI, the icons corresponding to the initial property listings rearranged on the GUI in a second order different from the first order based on the analytics of the actions; direct the client device to remove, from the GUI, one or more of the icons corresponding to the initial property listings and display, on the GUI, additional icons corresponding to the revised property listings; and a collaboration module, configured to: note a query from the buyer that is entered via a communications window on the client device and whether the query is a normal query or an urgent query, and parse the query; in response to determining that information corresponding to the query is within the parcel database, retrieve the information; in response to determining that the information corresponding to the query is not within the parcel database, process images or videos corresponding to the query to extract relevant data and generate the information from the extracted relevant data; insert the information into a conversation on the client device and indicate whether the information is a response to the normal query or to the urgent query, where the information is inserted via a message bubble, a popup window, or voice; examine communications between the buyer and the agent; detect change in buyer criteria by receiving a custom request for additional information from the buyer within the communications based on information provided in the revised property listings, where the additional information is not available in the parcel database; update the machine intelligence provided analytics based on the change in buyer criteria; and employ updated machine intelligence provided analytics to: match the custom request with a particular data source and obtain data from the data source corresponding to the additional information; generate the additional information based upon the data obtained from the particular data source; and insert the additional information into the communications that are transmitted from the agent back to the buyer.

BRIEF DESCRIPTION OF THE DRAWINGS

These and other objects, features, and advantages of the present invention will become better understood with regard to the following description, and accompanying drawings where:

FIG. 15 is a diagram detailing an exemplary agent display according to the present invention, such as may be presented on a client device; and FIG. 16 is a diagram illustrating an exemplary buyer display according to the present invention, such as may be presented on a client device.

DETAILED DESCRIPTION

Figure 1:
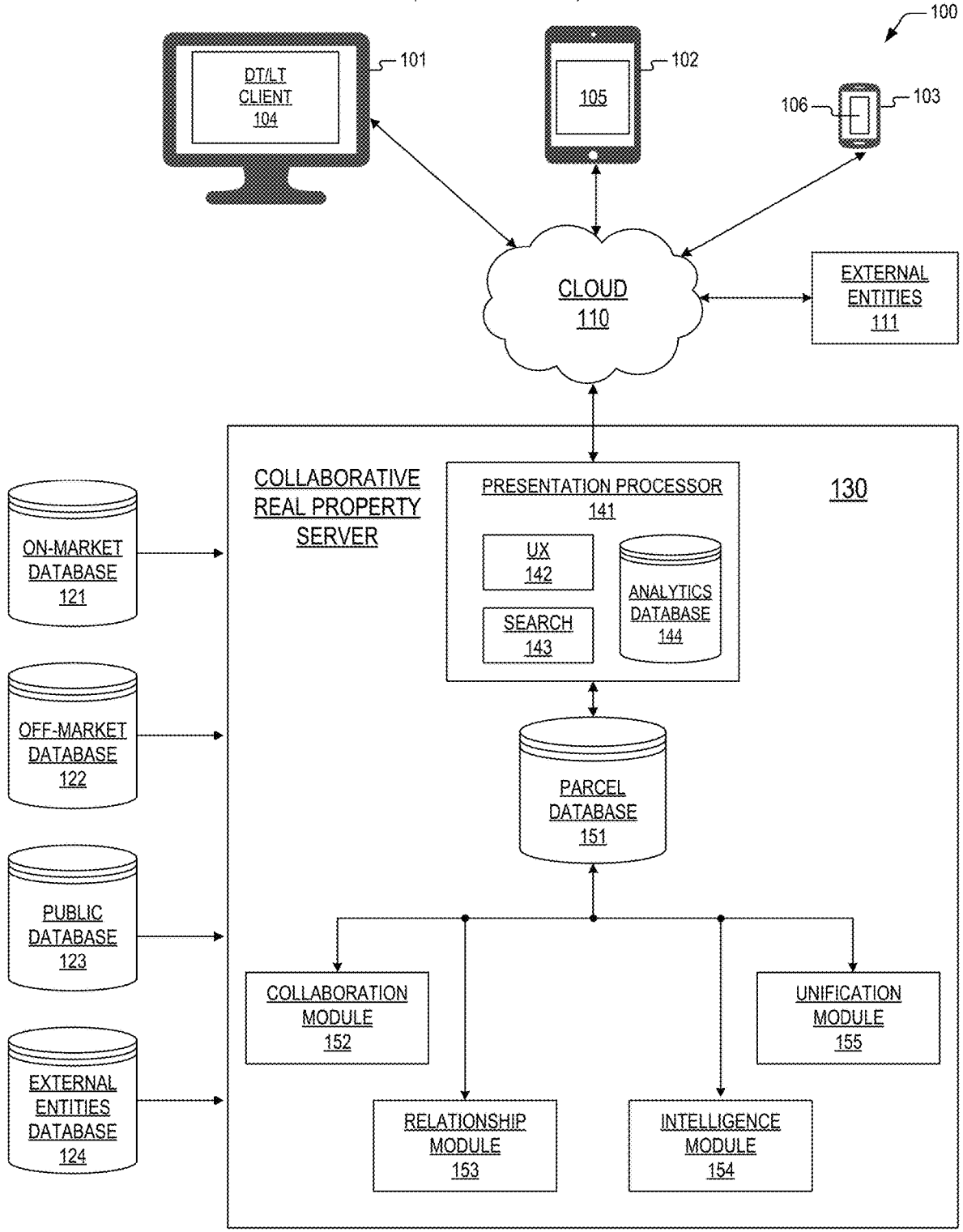
FIG. 1 is a block diagram illustrating an automated real property aggregation, unification, and collaboration system according to the present invention.

Exemplary and illustrative embodiments of the invention are described below. It should be understood at the outset that although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application," "application," "application program," "app," "computer program," or "program") by performing operations on data, where the operations may include arithmetic operations, logical operations, or input/output operations. A CPU may also be referred to as a "processor."

Module: As used herein, the term "module" may refer to, be part of, or include an application specific integrated circuit (ASIC), an electronic circuit, a processor (shared, dedicated, or group) and/or memory (shared, dedicated, or group) that execute one or more computer programs, a combinational logic circuit, and/or other suitable components that provide the described functionality.

In view of the above background discussion on real property marketing and associated techniques employed within present day systems that provide agents and buyers the ability to search for parcels that satisfy constraints of the buyers, a discussion of the present invention will now be presented with reference to FIGS. 1-11.

Referring to FIG. 1, a block diagram is presented illustrating an automated real property aggregation, unification, and collaboration system according to the present invention. The system 100 may include a collaborative real property server 130 that is coupled to one or more client devices 101-103 through the internet cloud 110. The client devices 101-103 may include one or more desktop/laptop computers 101 that execute desktop/laptop client applications 104 for communication and interaction with the valuation server 130 through the internet cloud 110. The client devices 101-103 may also include one or more smart tablet computers 102 that execute tablet client applications 105 for communication and interaction with the valuation server 130 through the internet cloud 110. The client devices 101-103 may further include one or more smartphone devices 103 that execute smartphone client applications 106 for communication and interaction with the valuation server 130 through the internet cloud 110.

The real property server 130 is coupled to an on-market database 121, an off-market database 122, a public database 123, and an external entities database 124. Though represented in the block diagram as single databases 121-124, each of the databases 121-124 may comprise a substantial number of databases through which the real property server 130 may access on-market real estate parcel data, off-market real estate parcel data, publicly and commercially available data corresponding to properties, and contact information data for external entities.

Preferably, entries within the on-market database 121 include parcel data retrieved from one or more multiple listing services (MLSs) in a regional market for which the real property server 130 is configured to service, web data retrieved from other MLS-like services (e.g., Zillow, Trulia), past market activities, seller disclosed information, real estate franchise notes on parcels, and real estate agent notes on properties. Entries within the off-market database 122 include pre-market listings, pocket listings, and listings for properties that are off-market for other reasons. Entries in the public database 123 include data retrieved from map services (e.g., location coordinates and street view photos), public institutions (tax assessors, county records, school districts), satellite imagery, etc. Entries in the external entities database 124 include contact information data for external entities such as, but not limited to, remodeling contractors, architects, structural engineers, utilities, home goods sellers, and issuers of building permits. The contact information data may also include whether the entities may be contacted to supply information (e.g., bids, schedules, etc.) automatically or manually, and preferred communications media (e.g., web form, email, SMS/text message, snail mail, telephone, etc.).

The real property server 130 may include a presentation processor 141 that is coupled to a parcel database 151. The presentation processor 141 comprises a user interface (UX) component 142, a search engine component 143, and an analytics database 144.

The real property server 130 may further comprise a collaboration module 152, a relationship module 153, an intelligence module 154, and a unification module 154, all of which are coupled to the parcel database 151.

In operation, access to the server 130 along with type of information that may be retrieved from the parcel database 151 are controlled by login credentials entered through one of the client devices 101-103 through one of the client applications 104-106. For example, a real estate agent's credentials may allow access to more parcels within the parcel database 151 along with access to more functions, as will be described in further detail below. A buyer's credentials, who is under contract with the real estate agent, may allow access to fewer parcels within the parcel database 151 along with access to fewer functions.

Entries ("records") within the parcel database 151 are all of the same unified format regardless of the database 121-124 that sourced the data. As one skilled in the art will appreciate, parcels in the on-market database 121 may comprise up to 500 data fields, while parcels in the off-market database 122 may comprise only a few data fields (e.g., address, price number of bedrooms, number of bathrooms). Accordingly, as will be described below, it is a feature of the present invention to aggregate real estate parcel information within a market region from disparate sources 121-122, to unify how this data is stored and accessed within the parcel database 151, to augment entries within the parcel database 151 with data obtained from the public database 123 and external entities, and to synthesize data for entries in the parcel database 151 from data obtained from the public database 123 and external entities, when actual data is not available.

The records are stored in the parcel database 151 for access by the presentation processor 141, the collaboration module 152, the relationship module 153, the intelligence module 154, and the unification module. Users (e.g., buyers, agents, and other collaborators) may execute the client applications 104-106 on the client devices 101-103 to specify constraints, weights, freeform search parameters, and discrete search parameters for one or more parcel records stored within the parcel database 151. The user interface processor 142 executes in order to transmit information and display windows to the client devices 101-103 via their respective client applications 104-106 to enable the users to specify the constraints, weights, and freeform/discrete search parameters. The client applications 104-106 may transmit the constraints, weights, and freeform/discrete search parameters to the presentation processor 141 through the internet cloud 110. Historical and current constraints, weights, freeform search parameters, and discrete search parameters are stored in corresponding user records within the analytics database 144 to accelerate subsequent searches along with analytics (e.g., statistical figures of merit) corresponding to the historical and current search parameters entered by the buyers and collaborators. Upon receipt of the constraints, weights, freeform search parameters, and discrete search parameters, the search engine processor 143 may perform pre-searches of freeform parameter entries by the user, and may cause the presentation processor 141 to transmit suggested freeform parameter entries to the user via the internet cloud 110. The user may accept one of the suggested freeform parameter entries or the user may continue entering freeform entry characters. The additional characters are transmitted to the presentation processor 141 and the search engine processor 143 may revise suggested freeform entries and cause the entries to be displayed to the user. The user may continue to add freeform characters, resulting in more refine freeform parameter suggestions by the search engine processor 143, or the user may delete some characters and add different characters. In one embodiment, suggestions of a plurality of freeform entries based upon characters entered by the user are transmitted for display to the user in less than 100 milliseconds.

Upon selection of a suggested freeform entry, the search engine processor 143 may execute a query of the parcel database 151 using the suggested freeform entry and discrete search parameters to access one or more records within the parcel database 151 that satisfy the suggested freeform entry and discrete search parameters. The one or more records within the parcel database 151 that satisfy the suggested freeform entry and discrete search parameters may also be stored in corresponding user records within the user database 144 to accelerate subsequent searches, and the one or more records within the parcel database 151 that satisfy the suggested freeform entry and discrete search parameters are provided by the search engine processor 143 to the user interface processor 142, which formats the one or more records for display by the client applications 104-106 on the client devices 101-103 according to device type, and the presentation processor 141 transmits the one or more records to the client devices 101-103 along with location contextual metadata corresponding to the one or more parcels (e.g., parcels shown on a map) that enable the users to visualize and better comprehend results of their searches.

In one embodiment, users may iteratively refine searches by specifying additional freeform/discrete search parameters to further target search results that are of interest, and these results are additionally stored in the corresponding user records within the user database 144.

Upon selection of a specific parcel record, the presentation processor 141 may transmit fields within the records that are formatted by the user interface processor 142 for display to the user along with metadata that enable the user to visualize and comprehend the record fields associated with the parcel, thus providing the user with a substantially improved method for making an informed decision regarding a corresponding parcel.

As is alluded to above, one of the significant disadvantages of present-day real estate search systems is limited functionality of those systems to foster collaboration between agents, buyers, and other collaborators. For example, consider that a buyer initially desires to purchase a 3-bedroom, 2-bath home in a given area, for a given price. Accordingly, the agent may specify these parameters in an MLS (or other service) search, and provide the buyer/collaborators with a list of properties that satisfy the initial constraints. But then the buyer/collaborators begin searching for properties having different constraints (more or less bedrooms and baths, different fixtures, different price, different area). Presently, there is no present-day system that will note and track such a divergence of constraints, and the present inventors have noted that it is an object of the present invention to employ analytics generated by the relationship module 153 and stored within the analytics database 144 to inform the agent of such divergence and to automatically suggest parcels that meet the changed constraints. Such analytics may include, but are not limited to, average property features that are viewed by a user, time spent viewing properties, number of times a user has viewed particular parcels, messages and frequency of communications between users and agents regarding particular properties. Such automatic suggestion of parcels, as will be described in further detail below, may result in automatic arrangement of icons and/or hyperlinks displayed on both an agent's client device 101-103 and a buyer's/collaborator's client device 101-103 so that the automatic arrangement of icons and/or hyperlinks promotes the properties that more closely correlate with the buyer's diverging interests to more prominent positions on the devices 101-103.

As noted above, the user interface processor 142 provides an access mechanism for each user (buyer, agent, collaborator) interacting with the real property aggregation, unification, and collaboration system 100. The format of the information presented via the client applications 104-106, as well as the type and amount of information presented may vary between user type, and the collaboration module 152 provides common elements that advantageously facilitate collaboration between users, providing near-real-time interaction and communication, and further enable each user to independently interact with each parcel under view. The collaboration module provides for the following functions:

Creation of a common collaboration space (e.g., analogy of a physical worktable) for each user to add, remove, and interact with real property listings and materials related to a real property transaction;

Provision of a communication mechanism to facilitate low latency interaction between users within a collaboration space (e.g., users around a virtual table);

Employment of an interface mechanism, described below, to create queries about real properties, where the queries are evaluated and dispatched to either an agent, a virtual agent assistant, or that are formatted as queries to the unification module 155 to retrieve additional real property information or, if the information is evaluated as important but unavailable, to notify the intelligence module 154 so that steps can be taken (e.g., estimates requested, quotes requested,) to obtain the requested information;

Providing an optimized experience among the users;

Providing contextually relevant augmentation of conversations with data on topics discussed (e.g., retrieving relevant statistics on schools mentioned in discussion; automatically calculating commute time to properties being discussed, etc.). The augmented data is presented in near-real-time during a conversational interaction, or via a separate augmentation window that displays the contextually relevant information that was retrieved but not available in real time;

Reducing latency in communication between parties by directing large payloads to more appropriate transmission mediums; and Reducing latency in communications by choosing the most appropriate medium for a given discussion type (e.g., SMS for quick short questions; email for topics that will take longer to respond in a complete and appropriate manner, etc.)

The present inventors note that it is useful to consider the topic monitoring and information augmentation functions of the collaboration module 152 as being analogous to a smart assistant (e.g., Alexa, Siri, Hey Google, etc.), where a buyer (or other collaborator) converses with an agent saying (or writing/typing), for example, "I wonder how big the master closet is?" This smart assistant functionality would note the question, parse the topic (i.e., size of master closet), retrieve the information from the parcel database 151, and insert the information into the conversation (e.g., via a message bubble; in a separate popup window; or even with voice if it is a voice conversation, to make it seem like the smart assistant function of the system 100 is one of the people in the conversation (e.g., "Hello, I checked the master closet and it is 8"×8"."). Additionally, the smart assistant function may perform language translation in the even the agent is working with a buyer who speaks a different language.

To provide for communication efficiency functions the collaboration module 152 is configured to recognize keywords when a buyer is sending a message to an agent. In one example, the buyer asks the agent, "Urgent: I need to see this property today," and the communication efficiency component recognized the keyword, "urgent," sends an SMS/text/iMessage, and sets a timer to ping the agent every few minutes. In a second example, consider that the buyer sends a message: "Just FYI, here is a video of the property I took when I drove by." In this example, the keyword "FYI" would indicate low priority, and since the message contained a video, it would upload it from the buyer, store it in the unified real property database for that property entry, and just send an email with a link to the agent.

The relationship module 153 controls interaction between the buyer (and collaborators), the agent, and interactions with the virtual agent assistant functionality. Accordingly, the relationship module 153 observes defined preferences (provided by a buyer) and synthesized preferences (by analyzing buyer actions that are retrieved from the analytics database 144) to accommodate the buyer's needs by optimizing real property lists, listing change notifications (e.g., new, changed, removed), connecting a buyer with an agent in the most appropriate medium (e.g., low latency, such as SMS, for urgent questions; higher latency, such as email, for extensive questions or media requiring analysis), and performing the functions of an agent assistant by facilitating showings (i.e., scheduling), responding to concise buyer requests for information (e.g., which school district is a given real property in) and providing directions to real properties. This relationship module 153 performs the following functions:

Monitoring and calculating analytics associated with activities of a buyer using the system 100 through the client devices 101-103

Monitoring and calculating analytics associated with buyer-agent interactions (e.g., response latency of agent to buyer initiated queries);

Prioritizing and rearranging icons and/or a list of real properties for display on the client devices 101-103 that result from analyzing viewing patterns, providing additional desired icons or parcels as a result of buyer analytics, removing icons or parcels that result from the analytics, and/or initiating requests for additional information to the unification module 155;

Providing relevant analytics from the analytics database 144 for display on the client devices 101-103 to the agent in order to optimize buyer experience;

Providing analytics to the agent's franchise demonstrating agent successes and deficiencies (e.g., response latency to buyer queries, correctness of information provided to buyer, etc.);

Retrieving real property data from the real property unification engine;

Providing a virtual agent assistant for buyer queries of data already available in parcel database 151;

Scheduling interactions between buyers, agents, and real properties (e.g., showings); and Optimizing schedules to reduce unproductive time and excessive transport energy use.

The intelligence module 154 is configured to resolve identified data deficiencies on a property within the parcel database 151, whether generated by the unification module 155 or generated via a deficiency identified by a user (e.g., as a request for additional info on a property). The intelligence module 154 controls retrieval of property data deficiencies and also identifies the best method for obtaining information to resolve the identified deficiencies. The intelligence module may facilitate retrieval of the information by performing tasks such as formatting/filling request for quote forms, managing outstanding requests for information made to external entities, and also by performing conversions between mediums of communication by text-to-speech and speech-to-text conversions in order to facilitate request for information directly in a more conversational manner than is available by prefilled forms.

The unification module 155 is configured to continuously query the on-market database 121, the off-market database 122, and the public database 123 for new and modified property listings, and to aggregate these properties within the parcel database 151 in a unified format. As noted above, a portion of the data may be retrieved from existing sources, such as the MLS, other web-based brokers, discount broker information, broker posts on social media, broker franchise web sites, data provided by sellers, and public records (e.g., taxes, boundary maps, and other external textual, image-based, or video-based content, previous listings of parcels, crime statistics, school ratings, etc.). This unification module 155 may also detect deficiencies of available information for parcels in the parcel database 151. The unification module may further retrieve parcels from the parcel database 151 by performing additional searches as a result of parameters provided by a user.

Advantageously, the real property aggregation, unification, and collaboration system 100 according to the present invention provides a platform 100 an overarching, consolidated, "ground truth" repository 151 for all available information on properties within a market area, where the data for the parcels is stored in a common format. The system 100 further is configured to synthesize new data by analyzing geospatial information contained in images and video media (e.g., identifying views from specific windows in a home, or estimating sunlight entering a window, illuminating a deck, etc.) as initiated by the relationship module 153, where the information is created to satisfy a specific identified contextual interest expressed by a buyer. Examples of this information might include the estimated costs of replacing kitchen appliances, cabinets and countertops, replacing a roof, or adding a deck onto the real property. In the example of determining the estimated costs for replacing kitchen cabinets, the system 100 might query commercial and/or public data sources to provide information on the property that estimates the build quality of real properties within a neighborhood, and would employ this estimate of build quality to formulate a query to identified cabinet makers whose contact information is stored within the external entities database 124 that serve the area in which the real property is located, and would initiate an estimate request with the identified companies. The system 100 would also manage providing physical access to the real property by scheduling access through the agent or seller and would also parse all received estimates and integrate the cabinet replacement costs into the available data for the given real property.

Figure 13:
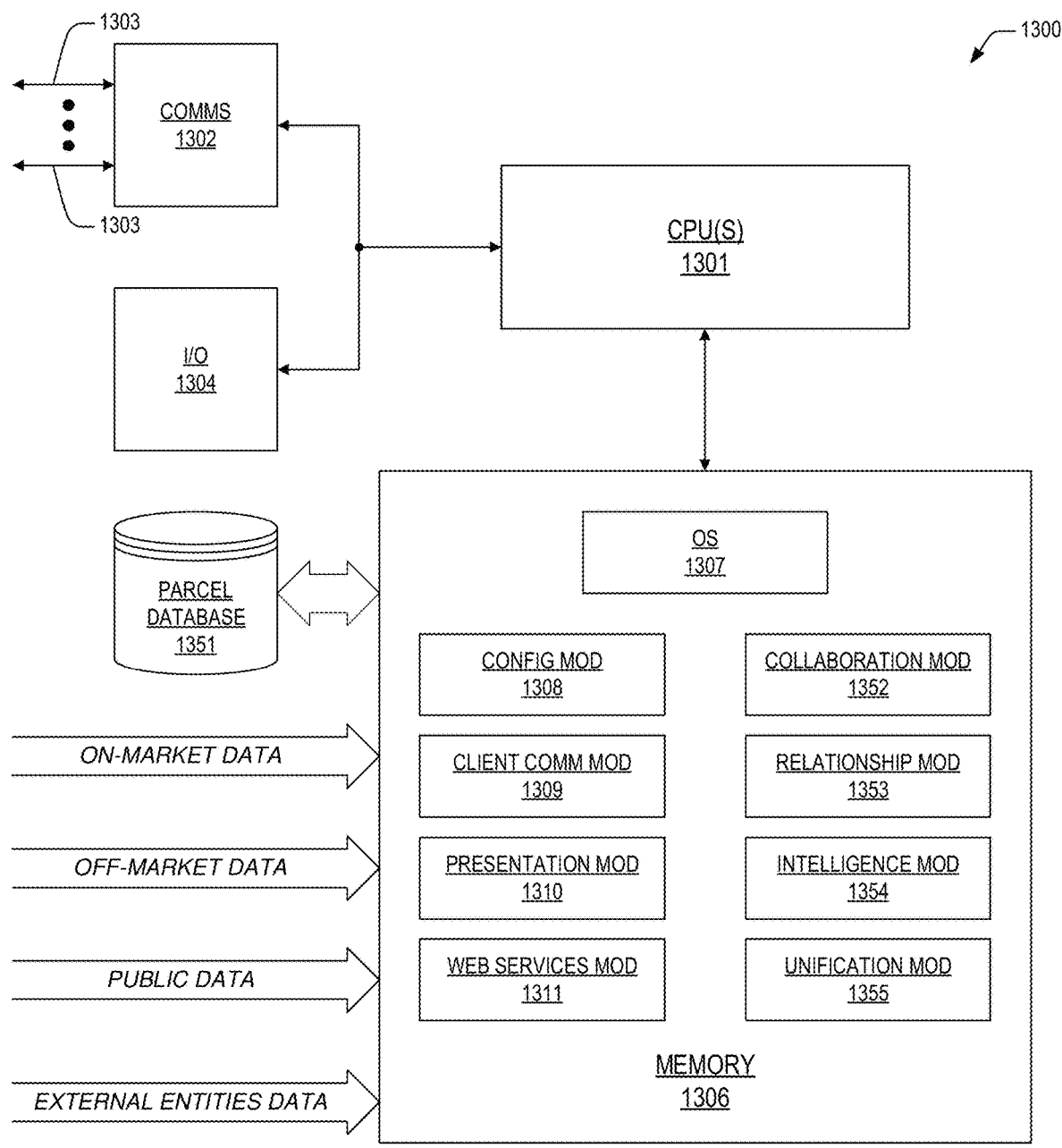
FIG. 13 is a block diagram featuring a collaborative real property server according to the present invention.

The collaborative real property server 130 according to the present invention may comprise one or more application programs executing thereon to perform the operations and functions described above, and which will be disclosed in further detail with reference to FIG. 13.

Figure 2:
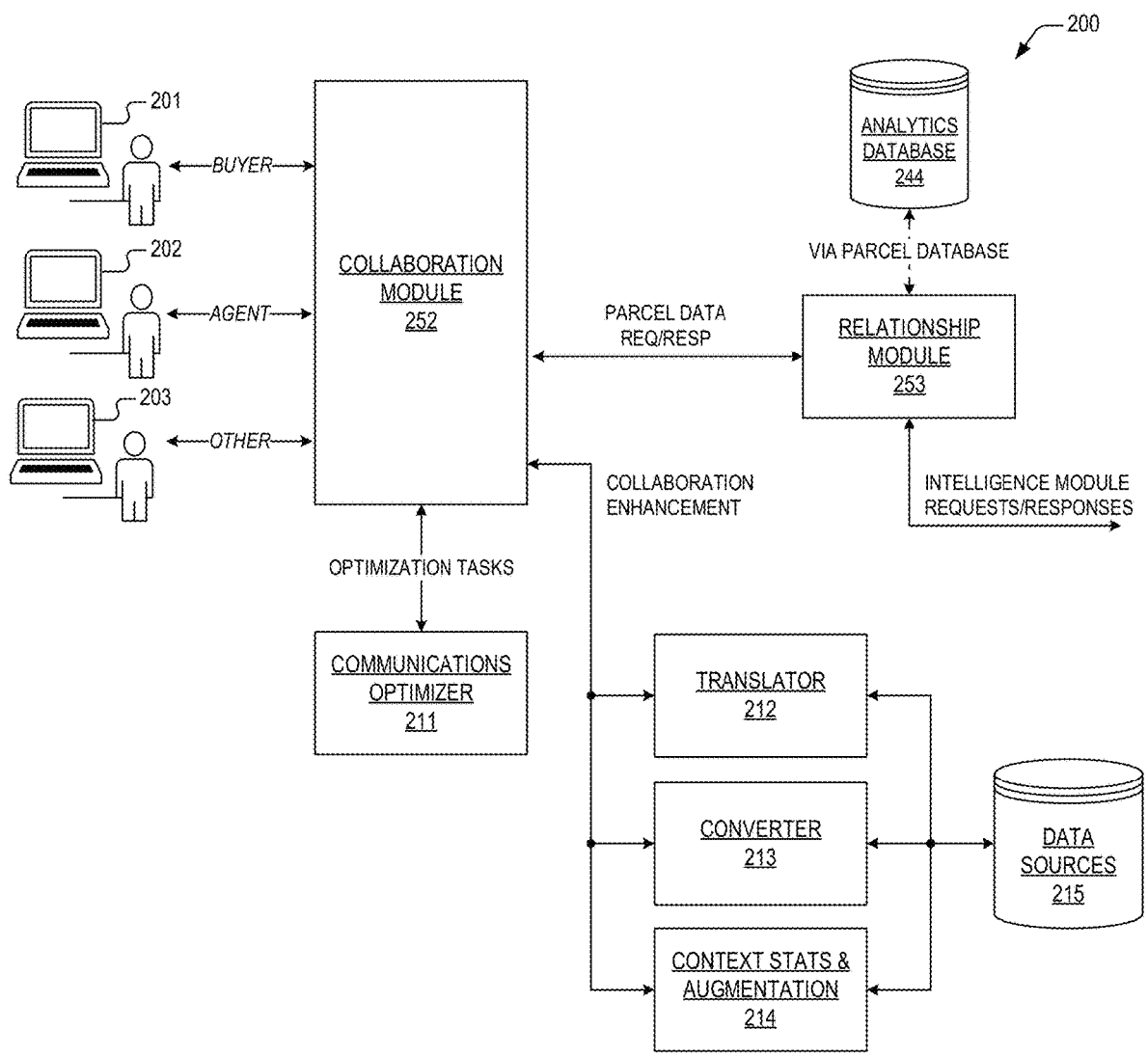
FIG. 2 is a block diagram depicting interactions between a collaboration module and relationship module within the system of FIG. 1.

Now turning to FIG. 2, a block diagram 200 is presented depicting interactions between a collaboration module and relationship module within the system of FIG. 1. The collaboration module 252 is coupled through the internet cloud 110 to one or more client devices 201-203 as discussed above, where the client devices 201-203 may be employed by a buyer, a listing agent, or another collaborator. The collaboration module 252 may be operationally coupled to a communications optimizer 211, the relationship module 253, a translator 212, a converter 213, and a context statistics and augmentation processor 214. The translator 212, a converter 213, and a context statistics and augmentation processor 214 are coupled to public data sources 215. The relationship module 253 is coupled to an analytics database 244 via a parcel database, as discussed above with reference to FIG. 1.

As noted above, the collaboration module 252 is configured to improve communications between the agent, buyer, and other collaborators by providing contextually relevant augmentation of conversations with data on topics discussed, to reduce latency in communications between parties by directing large payloads to more appropriate communication mediums, and to reduce latency in communications by selecting the most appropriate medium for a given discussion. For example, the communications optimizer 211 may select SMS/text for quick and short questions to the agent and may select email for topics that take a longer time to address. The translator 212 may be employed to perform language translation when the buyer and agent speak different languages by querying the data sources 215. The converter 213 may perform distance-to-travel time conversions and currency conversions by querying the data sources 215. And the context statistics and augmentation processor 214 may query the data sources 215 to augment topics noted during agent/buyer discussions with relevant information (e.g., info on schools, neighborhoods, taxes, crime rates, shopping, etc.). Such information is provided to the buyer/agent in near real time. The collaboration module 252 may issue a request for data on a property to the relationship module 253 for information that is unavailable in the parcel database 151, and the relationship module 253 may request and receive augmented and/or synthesized information that is provided via the intelligence module. The relationship module 253 may further update and employ analytics stored in the analytics database 244 to inform the buyer/agent of changes in buyer criteria.

Figure 3:
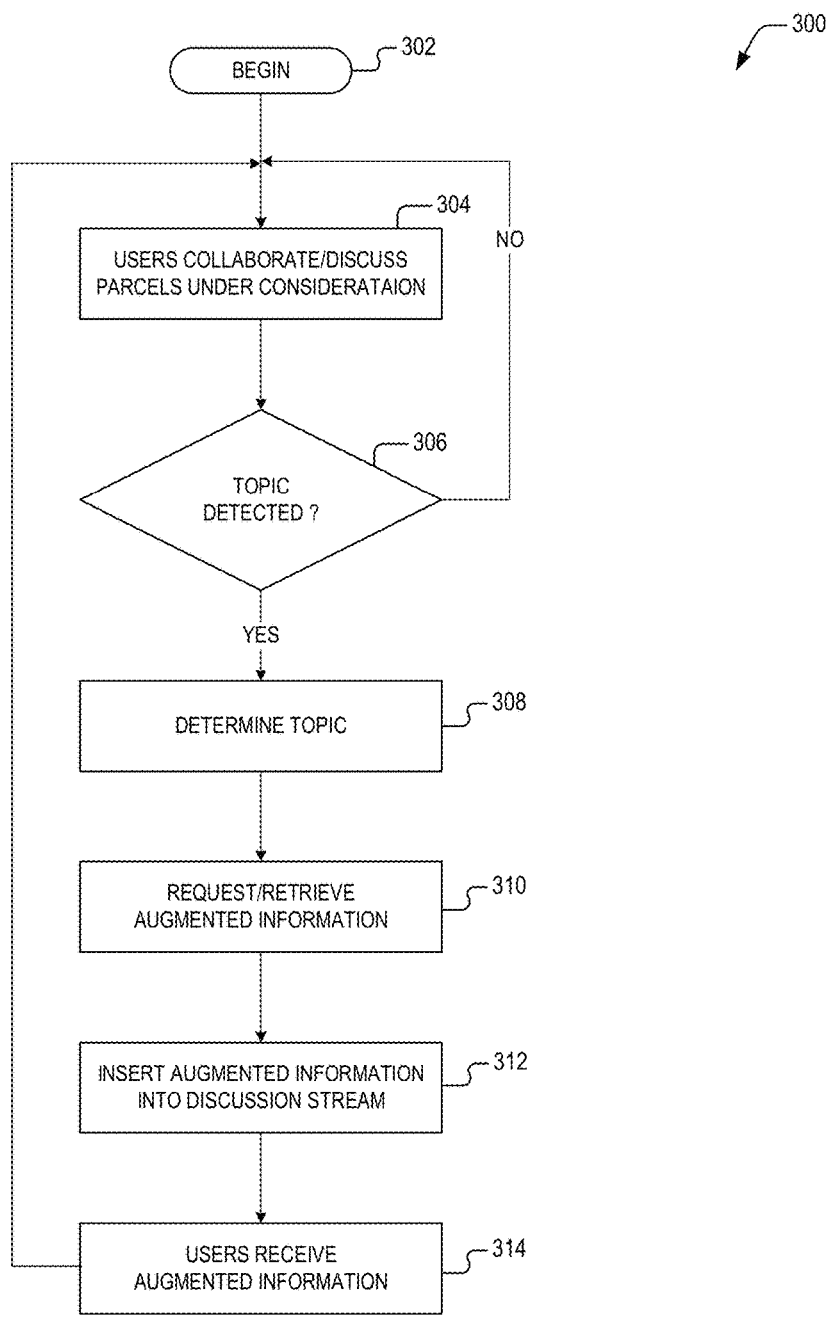
FIG. 3 is a flow diagram featuring an exemplary collaboration enhancement augmentation method according to the present invention, such as may be performed by the collaboration module of FIGS. 1 and 2.

Referring to FIG. 3, a flow diagram 300 is presented featuring an exemplary collaboration enhancement augmentation method according to the present invention, such as may be performed by the collaboration module of FIGS. 1 and 2. Flow begins at block 302 where users engage within a contractual arrangement for purposes of purchasing one or more real properties. Flow then proceeds to block 304.

At block 304, the users (buyer, collaborators, and agent) discuss parcels under consideration via communications through the system 100. Flow then proceeds to decision block 306.

At decision block 306, an evaluation is made to determine if a topic of the discussion has been detected. If not, then flow proceeds back to block 304. If so, then flow proceeds to bock 308.

At block 308, the collaboration module 252 determines the specific topic that was detected. Flow then proceeds to block 310.

At block 310, the collaboration module 252 issues a request for information to augment the detected topic and the translator 212, converter 213, and/or the context stats and augmentation processor 214 queries the data sources 215 to retrieve the information. The retrieved information is then provided to the collaboration module 252. Flow then proceeds to block 312.

At block 312, the retrieved information is then inserted by the collaboration module 252 into the discussion stream between the users. Flow then proceeds to block 314.

At block 314, the users receive the augmented information on their respective client devices 101-103. Flow then proceeds to block 304 as the users continue the discussion.

Figure 4:
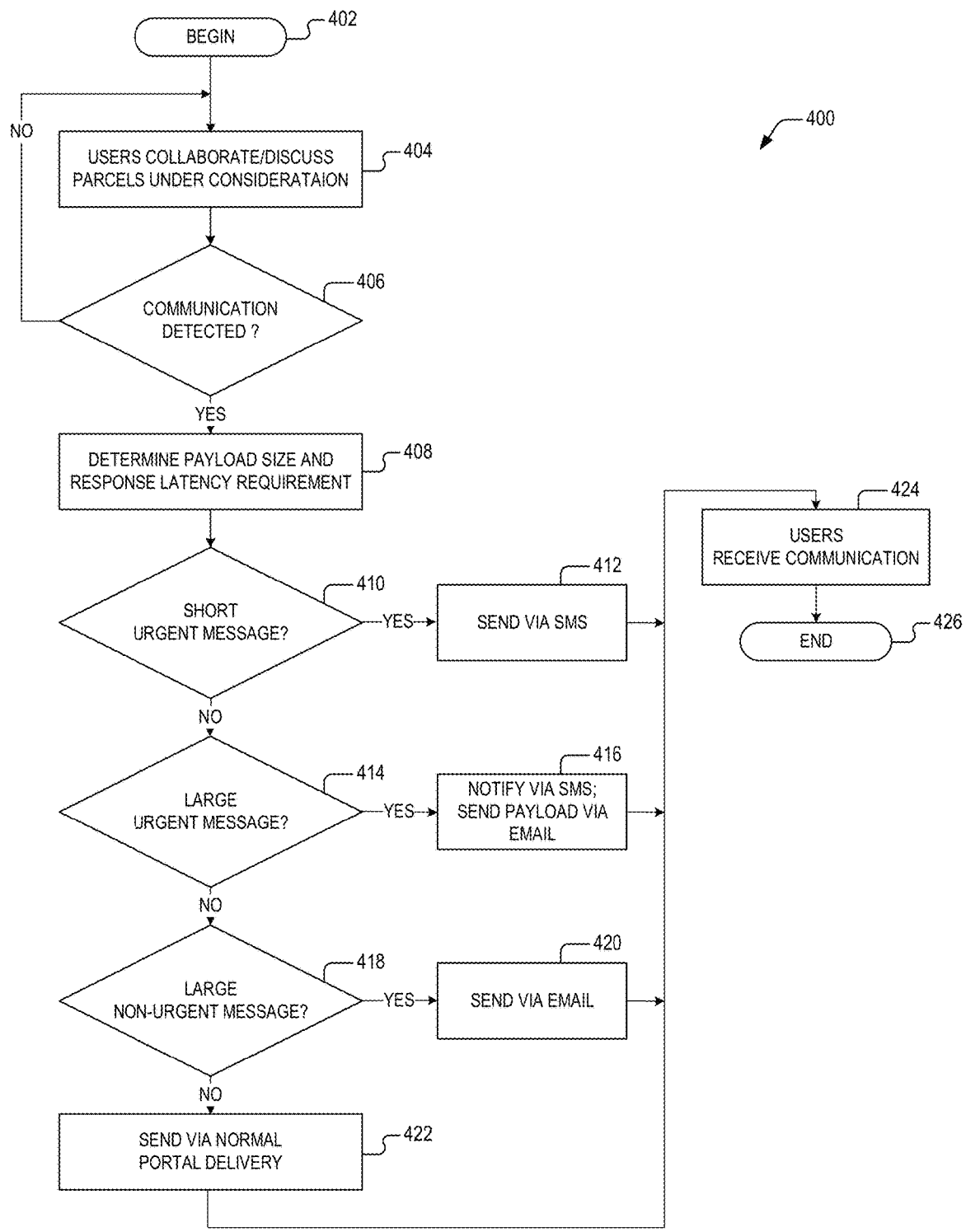
FIG. 4 is a flow diagram showing an exemplary communication medium selection method according to the present invention, such as may be performed by the collaboration module of FIGS. 1 and 2.

Turning now to FIG. 4, a flow diagram 400 is presented showing an exemplary communication medium selection method according to the present invention, such as may be performed by the collaboration module of FIGS. 1 and 2. Flow begins at block 402 where users engage within a contractual arrangement for purposes of purchasing one or more real properties. Flow then proceeds to block 404.

At block 404, the users (buyer, collaborators, and agent) discuss parcels under consideration via communications through the system 100. Flow then proceeds to decision block 406.

At decision block 406, an evaluation is made to determine if a communication has been detected. If not, then flow proceeds to block 404. If so, then flow proceeds to block 408.

At block 408, the collaboration module 252 directs the communications optimizer 211 to determine payload size and latency requirements for the detected communication. Flow then proceeds to decision block 410.

At decision block 410, an evaluation is made to determine if the communication is an urgent short message. If not, then flow proceeds to decision block 414. If so, then flow proceeds to block 412.

At block 412, the communication is sent via SMS/Text. Flow then proceeds to block 424.

At decision block 414, an evaluation is made to determine if the communication is a large urgent message. If not, then flow proceeds to decision block 418. If so, then flow proceeds to block 416.

At block 416 the recipient is notified of the communication via SMS/Text message and the payload of the communication is transmitted to the recipient via email. Flow then proceeds to block 424.

At decision block 418, an evaluation is made to determine if the communication is a large non-urgent message. If not, then flow proceeds to block 422. If so, then flow proceeds to block 420.

At block 420, the communication is sent via email to the recipient. Flow then proceeds to block 424.

At block 422, the communication is sent to the recipient via messaging internal to the system 100. Flow then proceeds to block 424.

At block 424, the recipient receives the communication. Flow then proceeds to block 426.

At block 426, the method completes.

Figure 5:
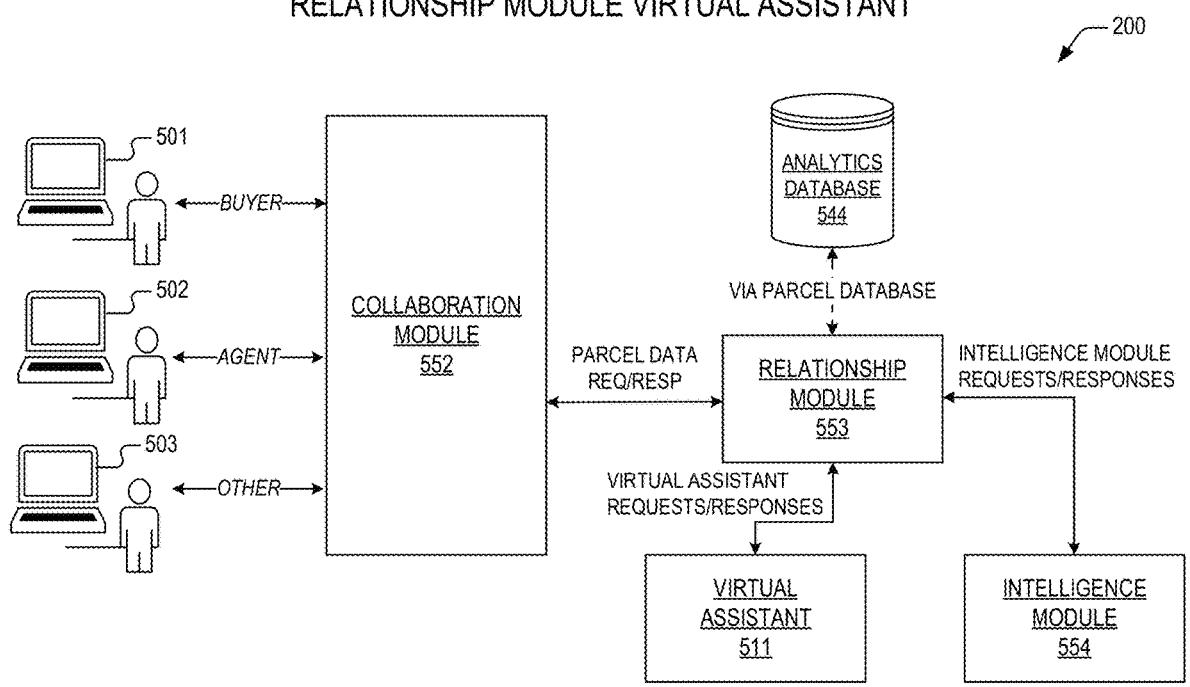
FIG. 5 is a block diagram detailing a virtual assistant according to the present invention that is called upon by the relationship module of FIG. 1.

Referring to FIG. 5, a block diagram 500 is presented detailing a virtual assistant according to the present invention that is called upon by the relationship module of FIG. 1. A collaboration module 552 is coupled through the internet cloud 110 to one or more client devices 501-503 as discussed above, where the client devices 501-503 may be employed by a buyer, a listing agent, or another collaborator. The collaboration module 552 may be operationally coupled to a relationship module 553. The relationship module 553 is coupled to an analytics database 244 via a parcel database, as discussed above with reference to FIG. 1. The relationship module 553 is also coupled to a virtual assistant module 511 and to an intelligence module 554.

As noted above, the collaboration module 252 is configured to improve communications between the agent, buyer, and other collaborators by providing contextually relevant augmentation of conversations with data on topics discussed. Accordingly, when topics are detected by the collaboration module 552, the collaboration module 552 issues requests for data related to one or more parcels to the relationship module 553. The relationship module 553 may employ analytics of the ongoing discussion, as supplied by an analytics database 554 to determine if the requests for data can be satisfied by the virtual assistant 511 and/or the intelligence module 554. The virtual assistant 511 may be configured to schedule agent/buyer appointments within the system 100, to schedule property showings, to provide directions to the property showings, and to monitor pending messages to agents withing and external to the system 100. The virtual assistant 511 may further escalate these messages to secondary contacts if the agents fail to respond.

In one embodiment, requests for virtual assistant functions described above and directly initiated by users of the system 100 in form of a virtual assistant request from the client devices 501-503.

Figure 6:
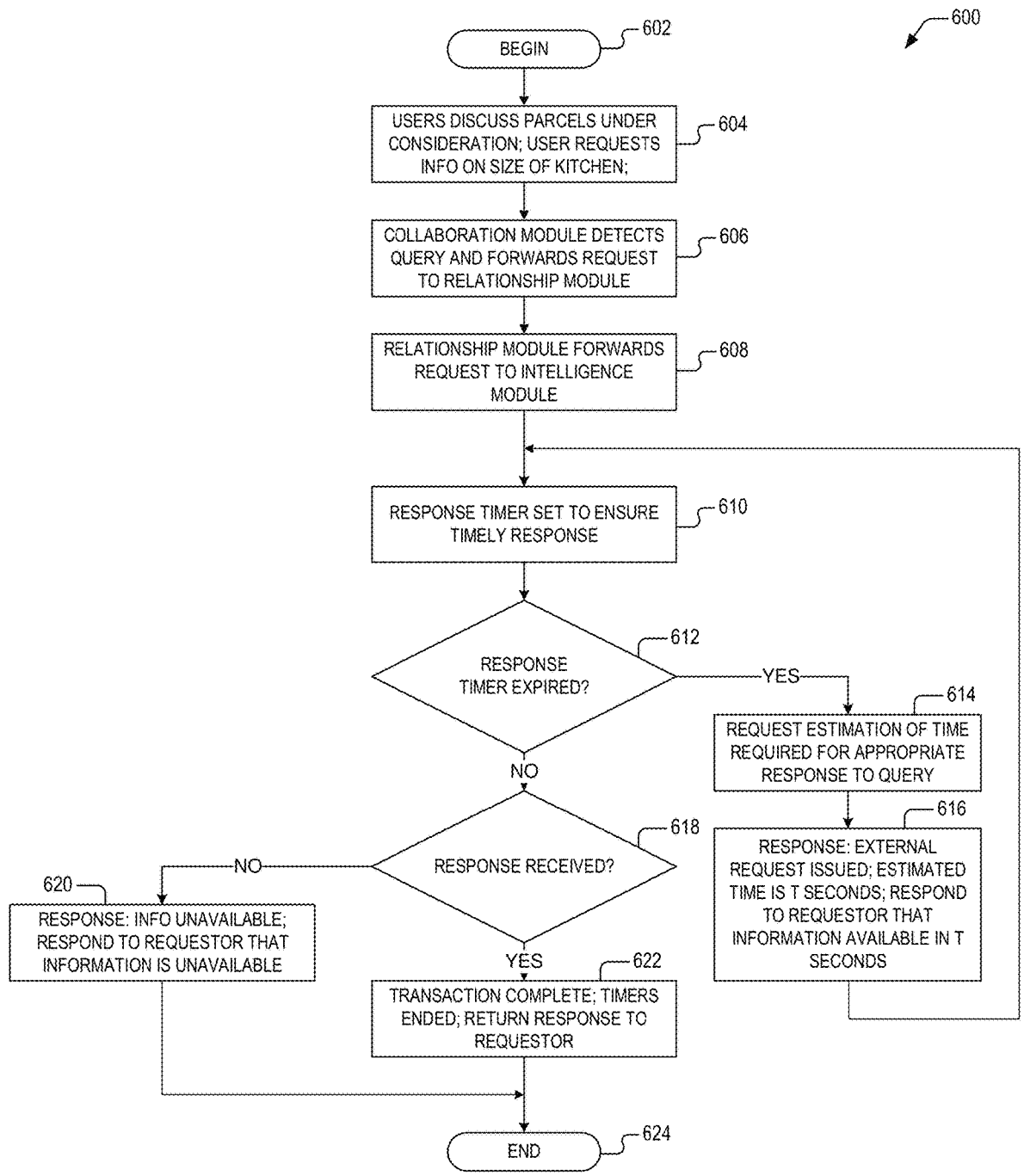
FIG. 6 is a flow diagram illustrating an exemplary relationship module method for property information retrieval according to the present invention.

Turning to FIG. 6, a flow diagram 600 is presented illustrating an exemplary relationship module method for property information retrieval according to the present invention. Flow begins at block 602 where users engage within a contractual arrangement for purposes of purchasing one or more real properties. Flow then proceeds to block 604.

At block 604, the users (buyer, collaborators, and agent) discuss parcels under consideration via communications through the system 100 and a user requests information on the size of a kitchen for a given parcel. Flow then proceeds to block 606.

At block 606, the collaboration module 552 detects the query and forward the request to the relationship module 553. Flow then proceeds to block 608.

At block 608, the relationship module 553 forwards the request to the intelligence module 554. Flow proceeds to block 610.

At block 610, the relationship module 553 sets a timer to ensure a timely response to the request. Flow then proceeds to decision block 612.

At decision block 612, an evaluation is made to determine if the timer has expired. If not, then flow proceeds to decision block 618. If so, then flow proceeds to block 614.

At block 614, the relationship module 553 requests the intelligence module 554 to estimate the time that is required to obtain an appropriate response to the request. Flow then proceeds to block 616.

At block 612, a notification to the requestor is provided that the requested information will be available in the time estimated by the intelligence module 554. This time, T, is passed from the relationship module 553 to the collaboration module 552, which then provides the notification in the system 100 to the requestor. Flow then proceeds to block 610 where the timer is updated to reflect the estimated time, T.

At decision block 618, and evaluation is made to determine if a response for the requested information has been received from the intelligence module 554. If not, then flow proceeds to block 620. If so, then flow proceeds to block 622.

At block 620, a notification to the requestor is provided that the requested information is not available. The notification is passed from the relationship module 553 to the collaboration module 552, which then provides the notification in the system 100 to the requestor. Flow then proceeds to block 624.

At block 622, the requested information is provided to the requestor via the relationship module 553 and collaboration module 552. The relationship module 553 ends any timers that have been set and marks the transaction as complete. Flow then proceeds to block 624.

At block 624, the method completes.

Figure 7:
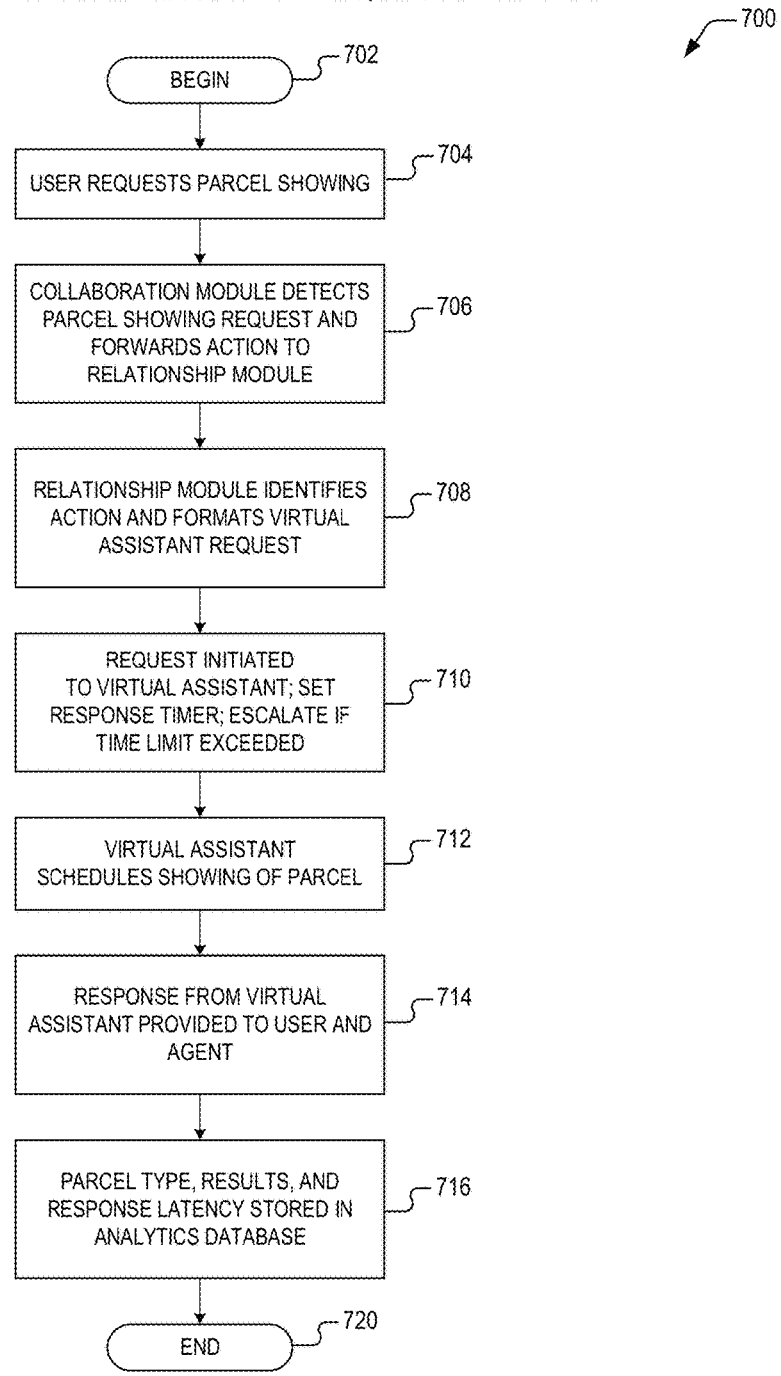
FIG. 7 is a flow diagram depicting an exemplary virtual assistant requests method according to the present invention.

Now referring to FIG. 7 a flow diagram 700 is presented depicting an exemplary virtual assistant requests method according to the present invention. Flow begins at block 702 where users engage within a contractual arrangement for purposes of purchasing one or more real properties. Flow then proceeds to block 704.

At block 704, the users (buyer, collaborators, and agent) discuss parcels under consideration via communications through the system 100 and a user requests a showing of a particular parcel. Flow then proceeds to block 706.

At block 706, the collaboration module 552 detects the parcel showing request and forwards the request to the relationship module 553. Flow then proceeds to block 708.

At block 708, the relationship module 553 identifies the action associated with the showing request and formats a request to the virtual assistant 511 to schedule the showing. Flow then proceeds to block 710.

At block 710, the request to the virtual assistant 511 is sent and a response timer is set. If the time limit is exceeded, the request to the virtual assistant 511 is escalated to be scheduled through a secondary contact for a seller's agent. Flow then proceeds to block 712.

At block 712, the virtual assistant 511 employs an appropriate communication medium to schedule a property showing with the seller's agent and the showing is scheduled. Flow then proceeds to block 714.

At block 714, a response indicated the scheduled showing is provided by the virtual assistant 511 to both the buyer and agent by routing the response through the relationship module 553, the collaboration module 552, through the cloud 110 to the appropriate client devices 501-503. Flow then proceeds to block 716.

At block 716, the parcel type, results (scheduled showing), and response latency are stored by the relationship module 553 in the analytics database 544. Flow then proceeds to block 720.

At block 720, the method completes.

Figure 8:
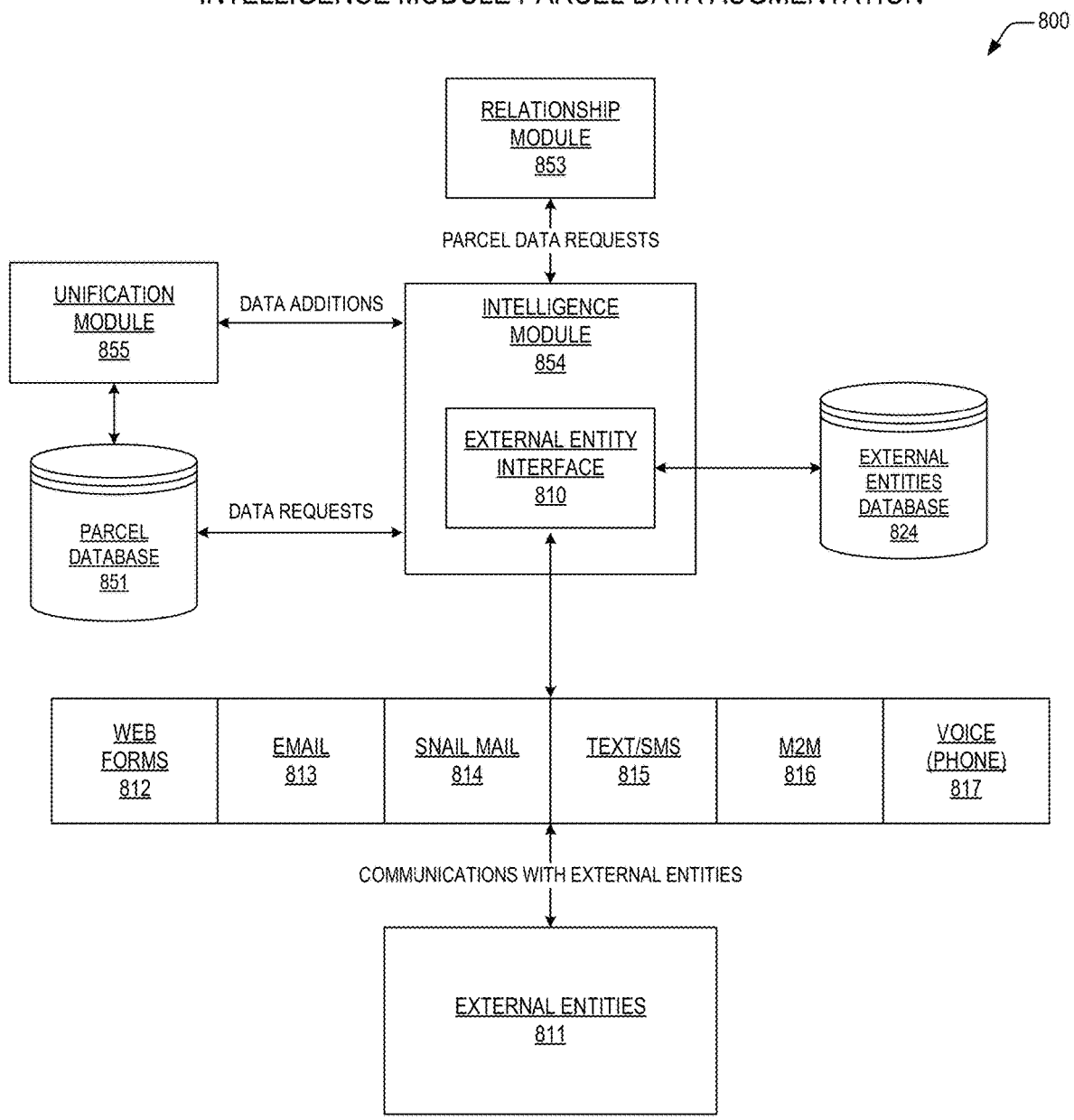
FIG. 8 is a block diagram featuring an intelligence module according to the present invention configured to augment parcel data that is stored within the parcel database of FIG. 1.

Now turning to FIG. 8, a block diagram 800 is presented featuring an intelligence module according to the present invention configured to augment parcel data that is stored within the parcel database of FIG. 1. The diagram 800 shows a relationship module 853 that issues requests for the parcel data to the intelligence module 854, as discussed above. The intelligence module 854 includes an external entity interface module 810 that is coupled to an external entities database 824, such as the external entities database 124 of FIG. 1. The external entity interface module 810 is also operationally coupled to external entities (e.g., contractors, architects, etc.) via one or more communications mediums 812-817 as are noted in respective entries in the external entities database 824. The intelligence module 854 is also coupled to a unification module 855 and to a parcel database 851. The parcel database 851 is also coupled to the unification module.

In operation, as a request is received from the relationship module 853 for data corresponding to a parcel, the intelligence module 810 first queries the parcel database 851 to determine if the requested data is available. If so, the data is provided by the requestor. If not, the intelligence module 854 determines an appropriate type of external entity to provide the requested data and finds contact information within the external entities database 824 for one or more external entities 811 within the area who can provide the information. Accordingly, the external entity interface 810 issues requests for the data to the one or more external entities 811 via the communications medium 812-817 that are stored within the external entities database 824 for each of the one or more external entities.

As the one or more external entities respond with the requested data, the intelligence module 854 provides the data to the requestor and also to the unification module 855, which in turn updates the corresponding parcel record in the parcel database 851.

Figure 9:
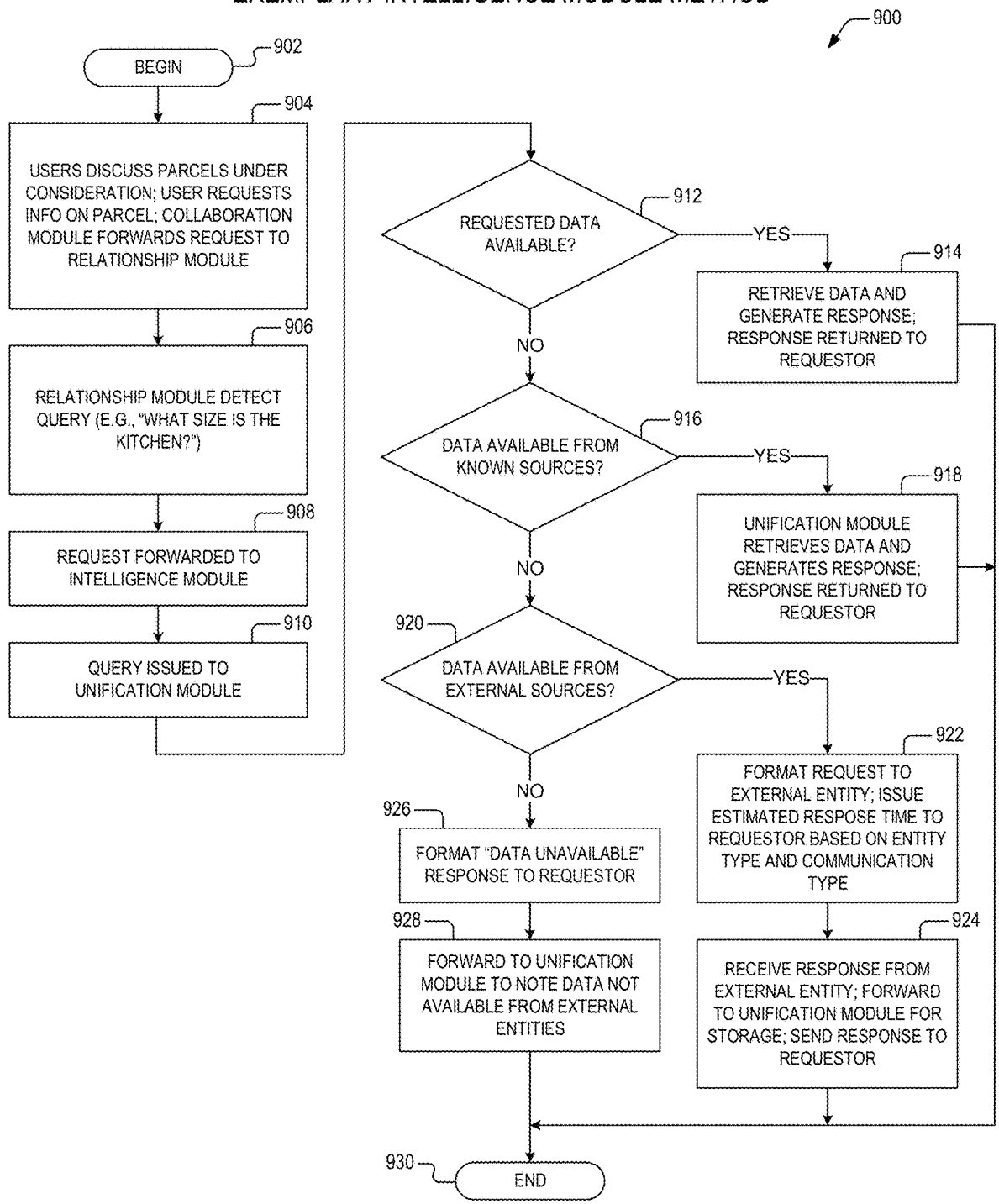
FIG. 9 is a flow diagram showing an exemplary intelligence module method for augmenting parcel data, such as may be performed by the system of FIGS. 1 and 8.

Referring now to FIG. 9, a flow diagram 900 is presented showing an exemplary intelligence module method for augmenting parcel data, such as may be performed by the system of FIGS. 1 and 8. Flow begins at block 902, where users engage within a contractual arrangement for purposes of purchasing one or more real properties. Flow then proceeds to block 904.

At block 904, the users (buyer, collaborators, and agent) discuss parcels under consideration via communications through the system 100 and a user requests data corresponding to a particular parcel. The collaboration module (not shown) forwards the request to the relationship module 853. Flow then proceeds to block 906.

At block 906, the relationship module 853 detects the request. Flow then proceeds to block 908.

At block 908, the relationship module 853 forwards the request to the intelligence module 854. Flow then proceeds to block 910.

At block 910, the intelligence module 854 queries parcel database 851 via the unification module 855 for the requested data. Flow then proceeds to decision block 912.

At decision block 912, an evaluation is made to determine if the requested data is available in the parcel database 851. If not, flow proceeds to decision block 916. If so, then flow proceeds to block 914.

At block 914, the unification module 855 retrieves the requested data from the parcel database 851. The intelligence module 854 generates a response including the requested data, which is routed to the requestor as is described above. Flow then proceeds to block 930.

At decision block 916, the intelligence module 854 determines if the data is available from known commercial and/or public data sources (not shown). If not, then flow proceeds to decision block 920. If so, then flow proceeds to block 918.

At block 918, the intelligence module 854 retrieves the requested data from the known data sources. The intelligence module 854 generates a response including the requested data, which is routed to the requestor as is described above. Flow then proceeds to block 930.

At decision block 920, the intelligence module determines if the requested data is available from one or more external entities. If not, then flow proceeds to block 926. If so, then flow proceeds to block 922.

At block 926, the intelligence module 854 formats a "data unavailable" response and the response is routed to the requestor as is described above. Flow then proceeds to block 928.

At block 928, the data unavailable response is sent to the unification module 855, which in turn updates the corresponding parcel record in the parcel database 851 to indicate that the requested information is not available. Flow then proceeds to block 930.

At block 922, a request for the data is formatted as noted above to one or more external entities 811 and an estimated response time is sent to the requestor based upon entity type and communication medium type. Flow then proceeds to block 924.

At block 924, the requested data is received from the one or more external entities 811. A response with the requested data is then sent to the requestor and to the unification module 855, which updates the corresponding parcel record in the parcel database 851 with the requested data provided by the one or more external entities 811. Flow then proceeds to block 930.

At block 930, the method completes.

Figure 10:
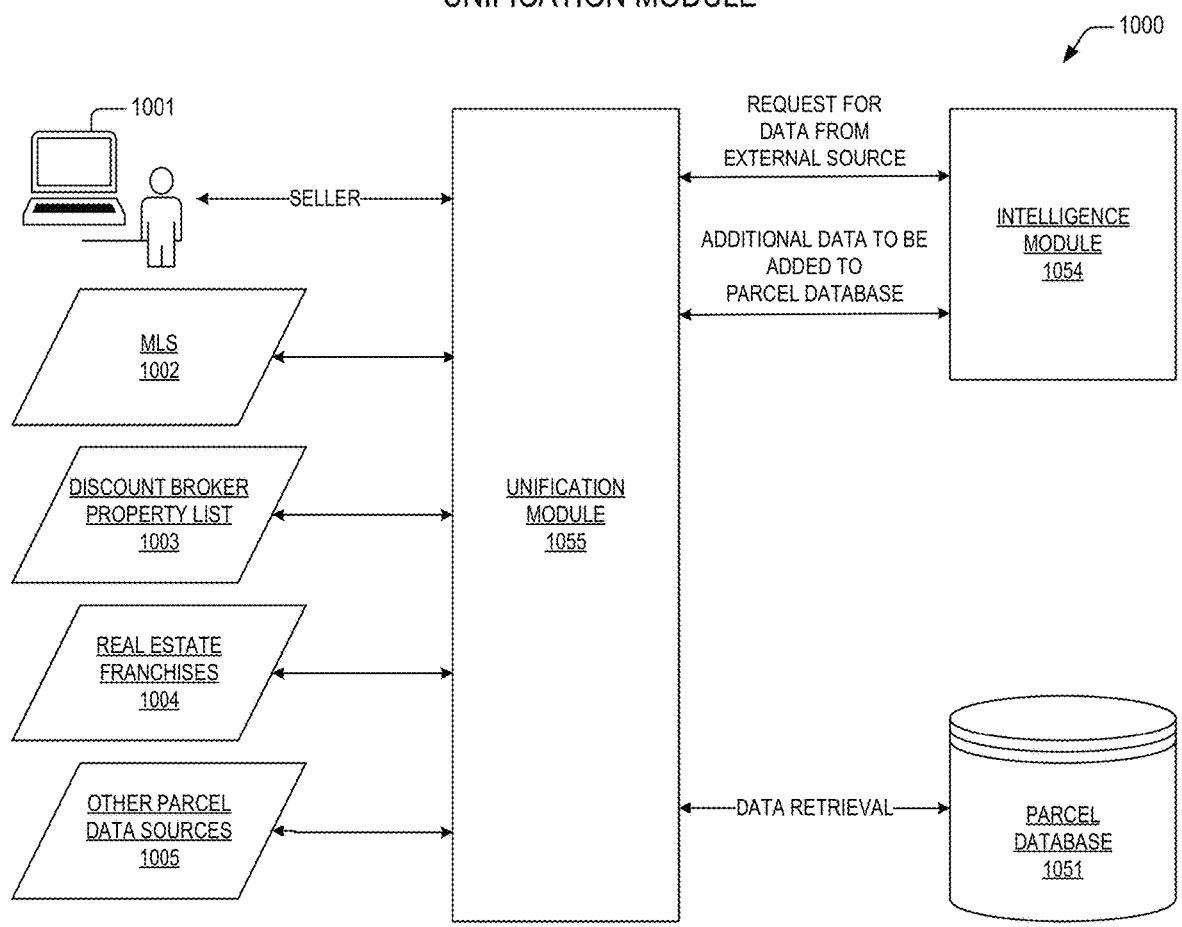
FIG. 10 is a block diagram detailing a unification module according to the present invention that is configured to aggregate and unify real property data within the system of FIG. 1.

Turning now to FIG. 10, a block diagram 1000 is presented detailing a unification module according to the present invention that is configured to aggregate and unify real property data within the system of FIG. 1. The unification module 1055 is coupled as described above to data sources 1001-1005 including, but not limited to, property sellers 1001, multiple listing services 1002, discount broker property lists 1003, real estate franchises 1004, and other parcel data source 1005 (e.g., Zillow, Trulia, social media, etc.). The unification module 1055 is also coupled to an intelligence module 1054 and to a parcel database 1051.

Operationally, the unification module 1055 continuously queries the data sources 1001-1005 for new or changed listings. In one embodiment, the unification module 1055 polls the data sources 1001-1005 every 2 seconds. Other polling times are contemplated depending upon market and source type. The unification module 1055 then converts the retrieved data to a common format and stores the parcel data in records within the parcel database 1051.

The intelligence module 1054 may issue requests from an external source (buyer, agent, collaborator) for data, which are provided to the unification module 1055. Then unification module, in turn, queries the parcel database 1051 and either provides the requested data to the intelligence module 1054 or informs the intelligence module that the data is not available. If the intelligence module 1054 is above to determine the requested data via the above techniques, then the data is provided to the unification module 1055, which updates corresponding records within the parcel database 1051.

Figure 11:
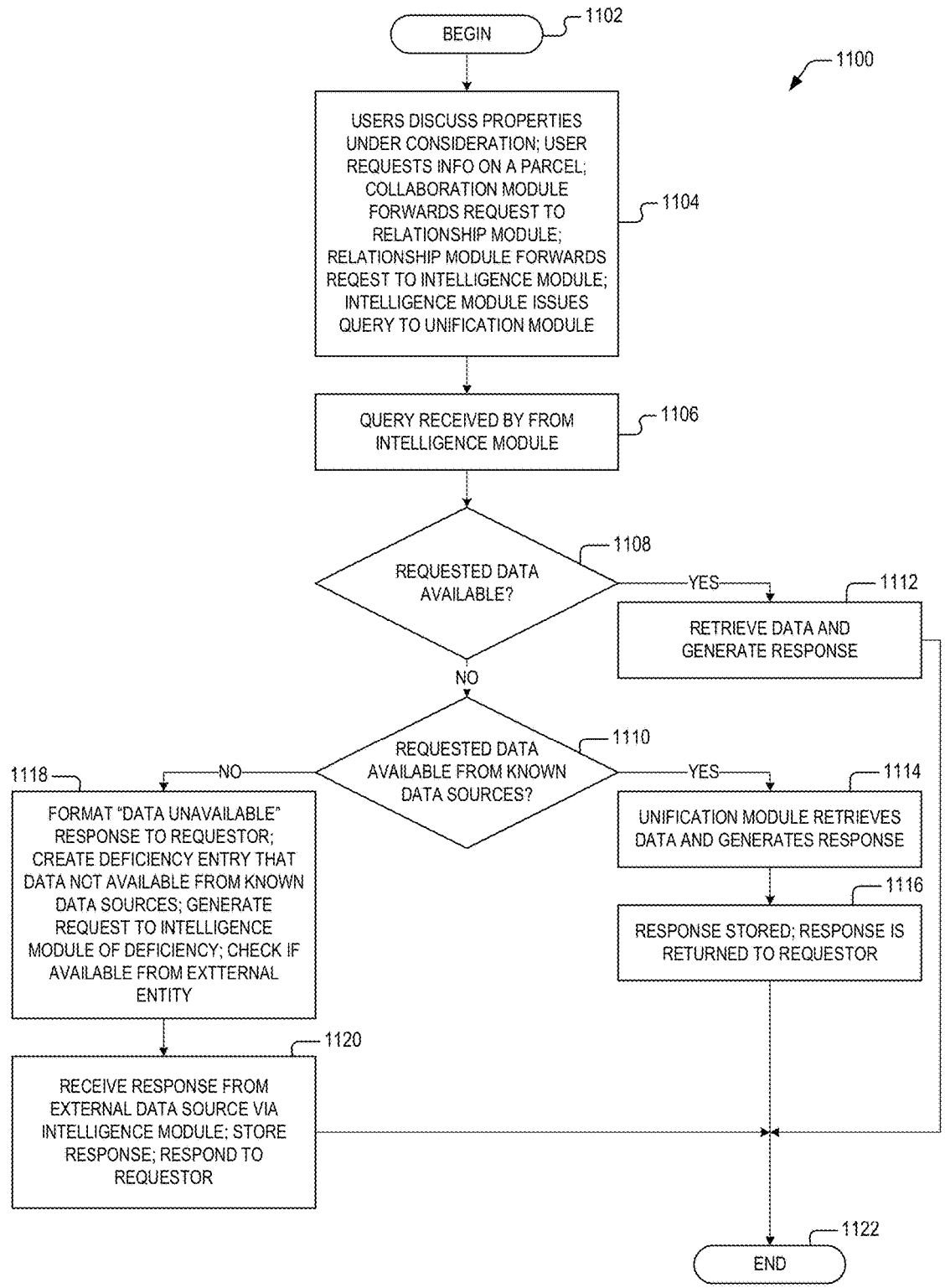
FIG. 11 is a flow diagram illustrating an exemplary unification module property information retrieval method according to the present invention.

Referring to FIG. 11, a flow diagram 1100 is presented illustrating an exemplary unification module property information retrieval method according to the present invention. Flow begins at block 1102, where users engage within a contractual arrangement for purposes of purchasing one or more real properties. Flow then proceeds to block 1104.

At block 904, the users (buyer, collaborators, and agent) discuss parcels under consideration via communications through the system 100 and a user requests data corresponding to a particular parcel. A collaboration module (not shown) forwards the request to a relationship module (not shown), which passes the request on to the intelligence module 1054, which issues the request to the unification module 1055. Flow then proceeds to block 1106.

At block 1106, the unification module 1055 receives the request from the intelligence module 1054. Flow then proceeds to decision block 1108.

At decision block 1108, the unification module 1055 determines if the requested data is available in the parcel database 1051. If not, then flow proceeds to decision block 1110. If so, then flow proceeds to block 1112.

At block 1112, the unification module 1055 retrieves the requested data from the parcel database 1051 and the data is sent in a response to the requestor. Flow then proceeds to block 1122.

At decision block 1110, the unification module determines if the data is available from known data sources 1001-1005. If so, then flow proceed to block 1114. If not, then flow proceeds to block 1118.

At block 1118, the unification module formats a data unavailable response to be sent to the requestor and creates a deficiency entry in the parcel database 1051 that the data is not available from known data source 1001-1005. The unification module 1005 then generates a request to the intelligence module to check if the requested data can be obtained from an external entity. Flow then proceeds to block 1120.

At block 1120, the data provided by the external entity is received by the unification module 1055, which in turns updates the corresponding record in the parcel database 1051. Flow then proceeds to block 1122.

At block 1114, the unification module 1055 retries the requested data from the known data source 1001-1005 and updates the parcel database. Flow then proceeds to block 1122.

At block 1122, the method completes.

Figure 12:
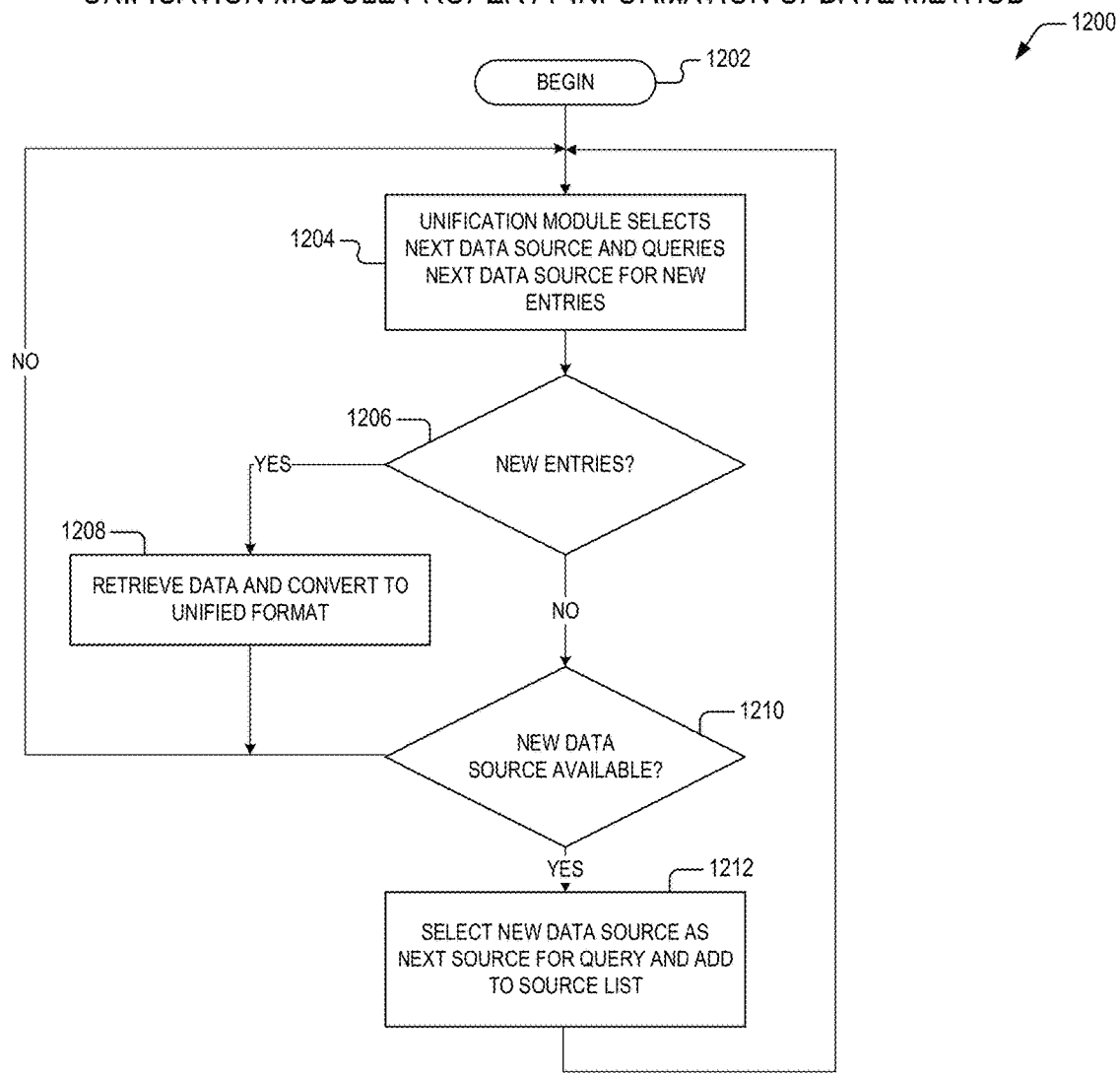
FIG. 12 is a flow diagram depicting an exemplary unification module property information update method according to the present invention.

Turning to FIG. 12, a flow diagram 1200 is presented depicting an exemplary unification module property information update method according to the present invention. Flow begins at block 1202, where a system 100 according to the present invention initiates an update cycle to update entries in the parcel database 1051 with new and/or changed information from the data sources 1001-1005. Flow then proceeds to block 1204.

At block 1204, the unification module 1055 selects a next data source and queries the next data source for new and/or modified listings. Flow then proceed to decision block 1206.

At decision block 1206, the unification module 1055 determines if the next data source has new and/or modified listings. If not, then flow proceeds to decision block 1210. If so then flow proceeds to block 1208.

At block 1208, the unification module 1055 retrieves the updated listings data from the next source, converts the data to the unified format, and stores the data in the parcel database 1051. Flow then proceeds to block 1204 where a next data source is selected, and the update cycle continues.

At decision block 1210, the unification module 1055 determines if a new source of data is available. If not, then flow proceeds to block 1204 where a next data source is selected, and the update cycle continues. If so, then flow proceeds to block 1212.

At block 1212, the new data source is selected as the next source for query and is added to the data source list maintained by the unification module 1055. Flow then proceeds to block 1204 where a next data source is selected, and the update cycle continues.

Referring now to FIG. 13, a block diagram is presented featuring a collaborative real property server 1300 according to the present invention, such as the server 130 of FIG. 1. The server 1300 may include one or more central processing units (CPU) 1301 that are coupled to memory 1306 having both transitory and non-transitory memory components therein. The CPU 1301 is also coupled to a communications circuit 1302 that couples the server 1300 to the internet cloud 110 via one or more wired and/or wireless links 1303. The links 1303 may include, but are not limited to, Ethernet, cable, fiber optic, and digital subscriber line (DSL). As part of the network path to and through the cloud 110, providers of internet connectivity (e.g., ISPs) may employ wireless technologies from point to point as well.

The server 600 may also comprise input/output circuits 1304 that include, but are not limited to, data entry and display devices (e.g., keyboards, monitors, touchpads, etc.). The memory 1306 may be coupled to a parcel database 1351 and to databases 121-124 described with reference to FIG. 1 above. Though the server 1300 is shown directly coupled to databases 121-124 and 1351, the present inventors note that interfaces to these data sources may exclusively be through the communications circuit 1302 or may be through a combination of direct interface and through the communications circuit 1302, according to the source of data.

The memory 1306 may include an operating system 1307 such as, but not limited to, Microsoft Windows, Mac OS, Unix, and Linux, where the operating system 1307 is configured to manage execution by the CPU 1301 of program instructions that are components of one or more application programs. In one embodiment, a single application program comprises a plurality of code segments 1308-1311 and 1352-1355 resident in the memory 1306 and which are identified as a configuration code segment CONFIG MOD 1308, a client communications code segment CLIENT COMM MOD 1309, a presentation processor code segment PRESENTATION MOD 1310, a web services code segment WEB SERVICES MOD 1311, an collaboration module code segment COLLABORATION MOD 1352, a relationship module code segment RELATIONSHIP MOD 1353, an intelligence module code segment INTELLIGENCE MOD 1354, and a unification module code segment UNIFICATION MOD 1355.

Operationally, the server 1300 may execute one or more of the code segments 1308-1311, 1352-1355 under control of the OS 1307 as required to enable the server 600 to ingest new data from external data sources 121-124, to employ data from the sources 121-124 in a unified format, and to store this unified listings data in the parcel database 1351 in a manner that can be rapidly and easily searched and accessed by users that communicate with the server 1300 over the communications circuit 1302 via client applications 104-106 executing on their respective client devices 101-103. The server 1300 may be configured to execute one or more of the code segments 1308-1311, 1352-1355 under control of the OS 1307 as required to enable the server 600 to format and present search results and corresponding parcel data to the client applications 104-106 executing on their respective client devices 101-103 with acceptable latencies, and to receive communications therefrom that users specify to narrow search results, to perform new searches altogether, and to calculate analytics corresponding to search criteria entered by the users over time.

CONFIG MOD 1308 may be executed to place the server 1300 into an operational or maintenance mode, where the maintenance mode may be entered to allow for ingestion of new data from the data sources 121-124 via automated or manual means. CLIENT COMM 1309 609 may be executed to perfect reliable transfer of information between the server 1300 and client applications 104-106 executing on respective client devices 101-103. PRESENTATION MOD 610 may be executed to suggest reorganization and reprioritization of real property listings as a result of buyer search analytics, and to perform searches of the parcel database 1351, to provide search results, and to interact with client applications 104-106 executing on respective client devices 101-103 as is described above. WEB SERV MOD 1311 may be executed to provide for formatting of information provided by PRESENTATION PROC MOD 1310 for transmission to the client applications 104-106 and for formatting of information that is provided to PRESENTATION PROC 610 which has been received from the client applications 104-106.

COLLABORATION MOD 1352 may be executed to perform any of the functions and operations described above with reference to the collaboration module 152 of FIG. 1. RELATIONSHIP MOD 1353 may be executed to perform any of the functions and operations described above with reference to the relationship module 153 of FIG. 1. INTELLIGENCE MOD 1354 may be executed to perform any of the functions and operations described above with reference to the relationship module 154 of FIG. 1. And UNIFICATION MOD 1355 may be executed to perform any of the functions and operations described above with reference to the unification module 155 of FIG. 1.

Figure 14:
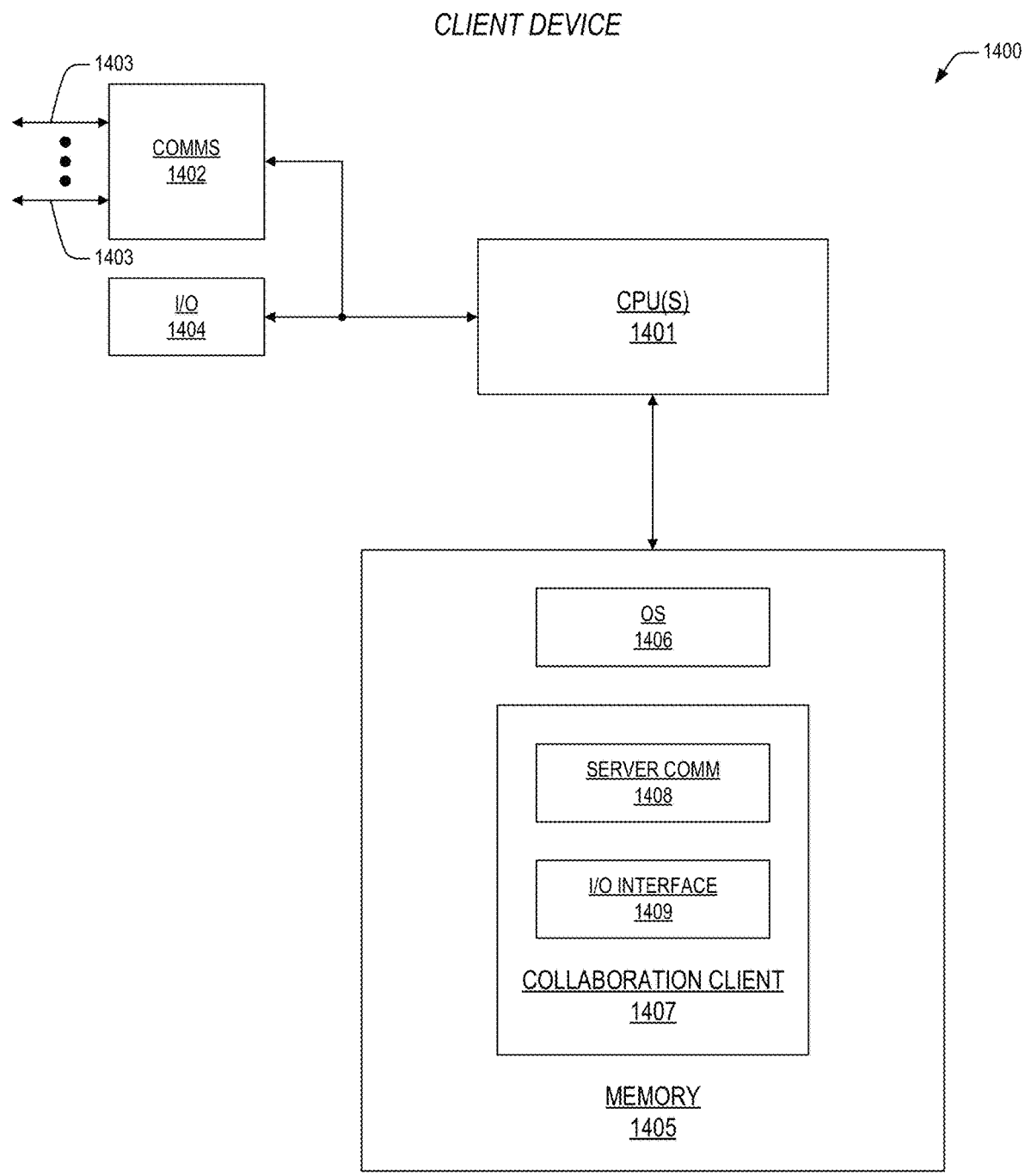
FIG. 14 is a block diagram showing a client device according to the present invention.

Now referring to FIG. 14, a block diagram is presented depicting a client device 700 according to the present invention, such as the client devices 101-103 discussed above with reference to FIG. 1. The client device 1400 may include one or more central processing units (CPU) 1401 that are coupled to memory 1405 having both transitory and non-transitory memory components therein. The CPU 1401 is also coupled to a communications circuit 1402 that couples the client device 1400 to internet cloud 110 via one or more wired and/or wireless links 1403. The links 1403 may include, but are not limited to, Ethernet, cable, fiber optic, and digital subscriber line (DSL).

The client device 1400 may also comprise input/output circuits 1404 that include, but are not limited to, data entry and display devices (e.g., keyboards, monitors, touchpads, etc.).

The memory 1405 may include an operating system 1406 such as, but not limited to, Microsoft Windows, Mac OS, Unix, Linux, iOS, and Android OS, where the operating system 1406 is configured to manage execution by the CPU 1401 of program instructions that are components of a collaboration client application program 1407. In one embodiment, the collaboration client application program 1407 comprises a server communications code segment SERVER COMM 1408 and an I/O interface code segment I/O INTERFACE 1409.

When executing on the client device 1400, the client 707 provides for display of information provided by the collaborative real property server 130 on the input/output circuits 1404 that help a user make decisions for performing searches of the parcel database 151. The SERVER COMM 1408 segment may execute to receive this information and the I/O INTERFACE segment 1409 may execute to transmit this information to the input/output circuit 1404. Likewise, the collaboration client 1407 provides for input of freeform and discrete search parameters provided by the user via the input/output circuit 1404 for transmission to the server 130 that direct the server 130 to refine an ongoing search in order to narrow down a number of parcels that satisfy the search parameters, and to specify freeform and discrete parameters that direct the server 130 to perform new searches altogether. The SERVER COMM 1408 segment may execute to transmit this information and the I/O INTERFACE segment 1409 may execute to receive this information to the input/output circuit 1404.

Now referring to FIG. 15, a diagram is presented detailing an exemplary agent display 1500 according to the present invention, such as may be presented on a client device 101-103. The display 1500 may include a buyer information window 1501 that identifies a buyer to the agent and that provides other relevant buyer information such as contact information, priority, and indications of divergence. The display 1500 may also comprise an agent listing window 1502 that shows property listings in order of relevancy to the buyer as have been previously noted by the system 100 in the analytics database 144. The display 1500 may further include an analytics window 1503 presenting relevant analytics for the buyer that have been determined from the buyer's interactions and searches with the system 100. The display 1500 may additionally include a diverged listings window 1504 that presents property listings in order of relevancy to the buyer as are currently noted by the system 100 in the analytics database 144. Note that as a result of analysis of the buyer's interactions with the system 100, listings A, B, C, E, F, and H have been removed, listings D, F, and G have been promoted, and listings I, J, K, M, and N have been added. In one embodiment, these listings comprise icons that may be selected. Another embodiment contemplates hyperlinks to additional data.

The display 1500 may further comprise a communications window 1505 that presents both urgent communication entries 1506 and normal communication entries 1507 between the parties.

Now turning to FIG. 16, a diagram is presented illustrating an exemplary buyer display 1600 according to the present invention, such as may be presented on a client device 101-103. The display 1600 may include an agent information window 1601 that identifies the buyer's agent and that provides other relevant agent information. The display 1600 may also comprise a listing window 1604 that shows property listings in order of relevancy to the buyer as is currently noted by the system 100 in the analytics database 144. Note that as a result of analysis of the buyer's interactions with the system 100, the listings and their order of relevancy match the diverged listings 1504 presented to the agent. In one embodiment, these listings comprise icons that may be selected. Another embodiment contemplates hyperlinks to additional data.

The display 1600 may further comprise a communications window 1605 that presents both urgent communication entries 1606 and normal communication entries 1607 between the parties.

Advantageously, the system 100 according to the present invention provides for Aggregation and unification of all real property data from numerous sources to enable all interested parties (e.g., agents, buyers, and collaborators) to collaborate for all interactions by providing a unified source of all available on-market and off-market listings as well as additional augmented/synthesized real property data and features useful to buyers. The system 100 according to the present invention also provides for facilitation of collaboration between real estate professionals, buyers, and other authorized collaborators (e.g., family, friends, etc.) via a central portal.

Although the present invention and its objects, features, and advantages have been described in detail, other embodiments are encompassed by the invention as well. For example, the present invention contemplates creation of value through the use of machine intelligence to provide extensive analytics of interested parties as well as creation of valuable data by processing information from multiple sources. Extraction of data via machine intelligence may include:
- processing pictures of properties to identify features, finish qualities, views from property windows, etc.;
- Employing geographic data to facilitate understanding of property location within a community (e.g., proximity to schools, businesses, open space, noise sources, environmental contaminants);
- Employing energy use data to facilitate understanding of energy footprint of property; and
- Using public data sources and records to facilitate understanding of area and property history (e.g., flooding, structural fire/wildfire risk, local vehicle accident rates, etc.).

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer program product, a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices. The devices may comprise one or more CPUs that are coupled to a computer-readable storage medium. Computer program instructions for these devices may be embodied in the computer-readable storage medium. When the instructions are executed by the one or more CPUs, they cause the devices to perform the above-noted functions, in addition to other functions.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. An automated method for obtaining, storing, searching, and presenting requested information for real estate properties, the method comprising:
   periodically accessing a plurality of data sources for property listings, wherein the plurality of data sources comprises on-market property sources and off-market property sources, the periodically accessing comprising:

retrieving the property listings from the plurality of sources;
converting the property listings to a common format; and
storing the property listings in the common format in a parcel database;
displaying, on a graphical user interface (GUI) of a client device, icons corresponding to initial property listings from the parcel database that meet initial requirements of a buyer arranged on the GUI in a first order;
monitoring actions of a buyer when searching for and viewing initial property listings, calculating machine intelligence provided analytics of the actions, and generating revised property listings from the parcel database that meet revised requirements of the buyer based on the machine intelligence provided analytics;
rearranging and displaying, on the GUI, the icons corresponding to the initial property listings rearranged on the GUI in a second order different from the first order base on the analytics of the actions;
removing, from the GUI, one or more of the icons corresponding to the initial property listings and displaying, on the GUI, additional icons corresponding to the revised property listings; and
examining communications between the buyer and the agent within an automated system, the examining comprising:
  noting a query from the buyer that is entered via a communications window on the client device and whether the query is a normal query or an urgent query, and parsing the query;
  in response to determining that information corresponding to the query is within the parcel database, retrieving the information;
  in response to determining that the information corresponding to the query is not within the parcel database, processing images or videos corresponding to the query to extract relevant data and generating the information from the extracted relevant data;
  inserting the information into a conversation on the client device and indicating whether the information is a response to the normal query or to the urgent query, wherein the information is inserted via a message bubble, a popup window, or voice;
  detecting a change in buyer criteria by detecting a custom request for additional information from the buyer within the communications based on information provided in the revised property listings, wherein the additional information is not available in the parcel database;
  updating the machine intelligence provided analytics based on the change in buyer criteria; and
  employing updated machine intelligence provided analytics to:
    match the custom request with a particular data source and obtain data from the data source corresponding to the initial information;
    generated the additional information based upon the data obtained from the particular data source; and
    insert the additional information into the communications that are transmitted from the agent back to the buyer.

2. The automated method as recited in claim 1, wherein:
the custom request comprises a contextual interest expressed by the buyer;
the particular data source comprises a service provider, wherein the service provider is listed in an external entities database, and wherein a request is issued to the service provider via an automated communications medium for the data; and
the data is automatically employed to generate the additional information to fulfil the custom request.

3. The automated method as recited in claim 2, wherein the custom request comprises a remodeling cost, the particular data source comprises a remodeling contractor, and the data comprises a remodeling bid.

4. The automated method as recited in claim 2, wherein the custom request comprises a home goods cost, the particular data source comprises a home goods seller, and the data comprises a home goods bid.

5. The automated method as recited in claim 2, wherein the custom request comprises a building permit request for a remodeling project, the data source comprises a building permit issuer, and the particular data comprises a schedule for obtaining the building permit.

6. The automated method as recited in claim 2, wherein the custom request comprises a request for a street view, the data source comprises a public map service, and the particular data comprises location coordinates and street photos.

7. The automated method as recited in claim 2, wherein the custom request comprises an estimate of sunlight entering a fixture, the particular data source comprises satellite imagery provider, and the data comprises images corresponding to sun positions.

8. A non-transitory computer-readable storage medium storing instructions that, when executed by a computer, cause the computer to perform a method searching, generating, and presenting requested information for real estate properties, the method comprising:
periodically accessing a plurality of data sources for property listings, wherein the plurality of data sources comprises on-market property sources and off-market property sources, the periodically accessing comprising:
  retrieving the property listings from the plurality of sources;
  converting the property listings to a common format; and
  storing the property listings in the common format in a parcel database;
displaying, on a graphical user interface (GUI) of a client device, icons corresponding to initial property listings from the parcel database that meet initial requirements of a buyer arranged on the GUI in a first order;
monitoring actions of a buyer when searching for and viewing initial property listings, calculating machine intelligence provided analytics of the actions, and generating revised property listings from the parcel database that meet revised requirements of the buyer based on the machine intelligence provided analytics;
rearranging and displaying, on the GUI, the icons corresponding to the initial property listings rearranged on the GUI in a second order different from the first order base on the analytics of the actions;
removing, from the GUI, one or more of the icons corresponding to the initial property listings and displaying, on the GUI, additional icons corresponding to the revised property listings; and
examining communications between the buyer and the agent within an automated system, the examining comprising:
  noting a query from the buyer that is entered via a communications window on the client device and whether the query is a normal query or an urgent query, and parsing the query;

in response to determining that information corresponding to the query is within the parcel database, retrieving the information;

in response to determining that the information corresponding to the query is not within the parcel database, processing images or videos corresponding to the query to extract relevant data and generating the information from the extracted relevant data;

inserting the information into a conversation on the client device and indicating whether the information is a response to the normal query or to the urgent query, wherein the information is inserted via a message bubble, a popup window, or voice;

detecting a change in buyer criteria by detecting a custom request for additional information from the buyer within the communications based on information provided in the revised property listings, wherein the additional information is not available in the parcel database;

updating the machine intelligence provided analytics based on the change in buyer criteria; and employing updated machine intelligence provided analytics to:
- match the custom request with a particular data source and obtain data from the data source corresponding to the initial information;
- generated the additional information based upon the data obtained from the particular data source; and
- insert the additional information into the communications that are transmitted from the agent back to the buyer.

9. The non-transitory computer-readable storage medium as recited in claim 8, wherein:

the custom request comprises a contextual interest expressed by the buyer;

the particular data source comprises a service provider, wherein the service provider is listed in an external entities database, and wherein a request is issued to the service provider via an automated communications medium for the data; and the data is automatically employed to generate the additional information to fulfil the custom request.

10. The non-transitory computer-readable storage medium as recited in claim 9, wherein the custom request comprises a remodeling cost, the particular data source comprises a remodeling contractor, and the data comprises a remodeling bid.

11. The non-transitory computer-readable storage medium as recited in claim 9, wherein the custom request comprises a home goods cost, the particular data source comprises a home goods seller, and the data comprises a home goods bid.

12. The non-transitory computer-readable storage medium as recited in claim 9, wherein the custom request comprises a building permit request for a remodeling project, the data source comprises a building permit issuer, and the particular data comprises a schedule for obtaining the building permit.

13. The non-transitory computer-readable storage medium as recited in claim 9, wherein the custom request comprises a request for a street view, the data source comprises a public map service, and the particular data comprises location coordinates and street photos.

14. The non-transitory computer-readable storage medium as recited in claim 9, wherein the custom request comprises an estimate of sunlight entering a fixture, the particular data source comprises satellite imagery provider, and the data comprises images corresponding to sun positions.

15. A system for obtaining, storing, searching, and presenting requested information for real estate properties, the system comprising:

a collaborative real estate server, coupled to one or more client devices via the internet cloud, configured to executed one or more applications programs comprising modules, the modules comprising:

a unification module, configured to:
- periodically access a plurality of data sources for property listings, wherein the plurality of data sources comprises on-market property sources and off-market property sources;
- retrieve the property listings from the plurality of sources;
- convert the property listings to a common format; and
- store the property listings in the common format in a parcel database;

a relationship module, configured to:
- direct a client device to display, on a graphical user interface (GUI) of the client device, icons corresponding to the initial property listings from the parcel database that meet initial requirements of a buyer arranged on the GUI in a first order;
- monitor actions of the buyer when searching for and viewing the initial property listings, calculate machine intelligence provided analytics of the actions, and generate revised property listings from the parcel database that meet revised requirements of the buyer based on the machine intelligence provided analytics;
- direct the client device to rearrange and display, on the GUI, the icons corresponding to the initial property listings rearranged on the GUI in a second order different from the first order based on the analytics of the actions;
- direct the client device to remove, from the GUI, one or more of the icons corresponding to the initial property listings and display, on the GUI, additional icons corresponding to the revised property listings; and a collaboration module, configured to:
- note a query from the buyer that is entered via a communications window on the client device and whether the query is a normal query or an urgent query, and parse the query;
- in response to determining that information corresponding to the query is within the parcel database, retrieve the information;
- in response to determining that the information corresponding to the query is not within the parcel database, process images or videos corresponding to the query to extract relevant data and generate the information from the extracted relevant data;
- insert the information into a conversation on the client device and indicate whether the information is a response to the normal query or to the urgent query, wherein the information is inserted via a message bubble, a popup window, or voice;
- examine communications between the buyer and the agent;
- detect change in buyer criteria by receiving a custom request for additional information from the buyer within the communications based on information provided in the revised property listings, where the additional information is not available in the parcel database;

update the machine intelligence provided analytics based on the change in buyer criteria; and employ updated machine intelligence provided analytics to:

match the custom request with a particular data source and obtain data from the data source corresponding to the additional information;

generate the additional information based upon the data obtained from the particular data source; and insert the additional information into the communications that are transmitted from the agent back to the buyer.

16. The system as recited in claim 15, wherein:

the custom request comprises a contextual interest expressed by the buyer;

the particular data source comprises a service provider, wherein the service provider is listed in an external entities database, and wherein a request is issued to the service provider via an automated communications medium for the data; and the data is automatically employed to generate the additional information to fulfil the custom request.

17. The system as recited in claim 16, wherein the custom request comprises a remodeling cost, the particular data source comprises a remodeling contractor, and the data comprises a remodeling bid.

18. The system as recited in claim 16, wherein the custom request comprises a home goods cost, the particular data source comprises a home goods seller, and the data comprises a home goods bid.

19. The system as recited in claim 16, wherein the custom request comprises a request for a street view, the particular data source comprises a public map service, and the data comprises location coordinates and street photos.

20. The system as recited in claim 16, wherein the custom request comprises an estimate of sunlight entering a fixture, the particular data source comprises satellite imagery provider, and the data comprises images corresponding to sun positions.

\* \* \* \* \*